(12) United States Patent
DeMeritt et al.

(10) Patent No.: US 11,247,932 B2
(45) Date of Patent: Feb. 15, 2022

(54) LIQUID-ASSISTED LASER MICROMACHINING SYSTEMS AND METHODS FOR PROCESSING TRANSPARENT DIELECTRICS AND OPTICAL FIBER COMPONENTS USING SAME

(71) Applicant: CORNING INCORPORATED, Corning, NY (US)

(72) Inventors: Jeffery Alan DeMeritt, Painted Post, NY (US); Davide Domenico Fortusini, Painted Post, NY (US); Andrey Kobyakov, Painted Post, NY (US); David Mark Lance, Elmira, NY (US); Leonard Thomas Masters, Painted Post, NY (US); Ulrich Wilhelm Heinz Neukirch, Painted Post, NY (US); Alexander Mikhailovich Streltsov, Corning, NY (US); James Scott Sutherland, Corning, NY (US)

(73) Assignee: Corning Incorporated, Corning, NY (US)

(*) Notice: Subject to any disclaimer, the term of this patent is extended or adjusted under 35 U.S.C. 154(b) by 330 days.

(21) Appl. No.: 16/257,853

(22) Filed: Jan. 25, 2019

(65) Prior Publication Data

US 2019/0232435 A1  Aug. 1, 2019

Related U.S. Application Data

(60) Provisional application No. 62/622,265, filed on Jan. 26, 2018.

(51) Int. Cl.
*B23K 26/38* (2014.01)
*C03B 33/08* (2006.01)
(Continued)

(52) U.S. Cl.
CPC .......... *C03B 33/082* (2013.01); *B23K 26/009* (2013.01); *B23K 26/0648* (2013.01);
(Continued)

(58) Field of Classification Search
CPC .. B23K 26/122; B23K 26/402; B23K 26/046; B23K 26/048; B23K 26/0665;
(Continued)

(56) References Cited

U.S. PATENT DOCUMENTS 5,594,479 A    1/1997   Inoue et al.
5,656,186 A *   8/1997   Mourou ................. A61B 18/20
                                                     219/121.69
(Continued)

FOREIGN PATENT DOCUMENTS

JP       8132260 A      5/1996
JP       9141480 A      6/1997
JP    2006068789 A *   3/2006  ......... B23K 26/1224

OTHER PUBLICATIONS

Dell'Aglio et al., "Mechanisms and Processes of Pulsed Laser Ablation in Liquids During Nanoparticle Production", Applied Surface Science, vol. 348, Sep. 1, 2015, pp. 4-9.
(Continued)

*Primary Examiner* — Geoffrey S Evans
(74) *Attorney, Agent, or Firm* — Grant A. Gildehaus

(57) ABSTRACT

The liquid-assisted micromachining methods include methods of processing a substrate made of a transparent dielectric material. A working surface of the substrate is placed in contact with a liquid-assist medium that comprises fluorine. A focused pulsed laser beam is directed through a first substrate surface and through the opposite working surface to form a focus spot in the liquid-assist medium. The focus spot is then moved over a motion path from its initial position in the liquid-assist medium through the substrate
(Continued)

body in the general direction from the working surface to the first surface to create a modification of the transparent dielectric material that defines in the body a core portion. The core portion is removed to form the substrate feature, which can be a through or closed fiber hole that supports one or more optical fibers. Optical components formed using the processed substrate are also disclosed.

45 Claims, 22 Drawing Sheets

(51) Int. Cl.

| | | |
|---|---|---|
| *C03B 33/02* | (2006.01) | |
| *G02B 6/36* | (2006.01) | |
| *C03B 33/04* | (2006.01) | |
| *B23K 26/384* | (2014.01) | |
| *B23K 26/00* | (2014.01) | |
| *B23K 26/06* | (2014.01) | |
| *B23K 26/40* | (2014.01) | |
| *B23K 26/122* | (2014.01) | |

(52) U.S. Cl.
CPC ........ *B23K 26/0665* (2013.01); *B23K 26/384* (2015.10); *B23K 26/40* (2013.01); *C03B 33/0222* (2013.01); *C03B 33/04* (2013.01); *G02B 6/3616* (2013.01); *G02B 6/3644* (2013.01); *G02B 6/3684* (2013.01); *B23K 26/122* (2013.01); *G02B 6/3688* (2013.01)

(58) Field of Classification Search
CPC ...... B23K 26/146; B23K 26/50; B23K 26/55; B23K 26/384; B23K 26/382
See application file for complete search history.

(56) References Cited

U.S. PATENT DOCUMENTS

| | | |
|---|---|---|
| 6,299,707 B1 | 10/2001 | Mccay et al. |
| 6,362,453 B1 * | 3/2002 | Wang .................. B23K 26/18 |
| | | 219/121.69 |
| 6,990,285 B2 | 1/2006 | Schroeder et al. |
| 7,422,375 B2 | 9/2008 | Suzuki et al. |
| 7,893,386 B2 | 2/2011 | Otis et al. |
| 9,720,264 B2 * | 8/2017 | Gutsche ................ G02B 6/024 |
| 2003/0052098 A1 | 3/2003 | Kim et al. |
| 2004/0190851 A1 | 9/2004 | Garner et al. |
| 2005/0025445 A1 | 2/2005 | Schoroeder et al. |
| 2006/0163209 A1 * | 7/2006 | Boyle ................ B23K 26/1224 |
| | | 216/94 |
| 2007/0129273 A1 | 6/2007 | Clark et al. |
| 2009/0145880 A1 | 6/2009 | Mayer et al. |
| 2012/0189903 A1 | 7/2012 | Kawada et al. |
| 2012/0205354 A1 * | 8/2012 | Kudoh ................ B23K 26/355 |
| | | 219/121.69 |
| 2013/0344302 A1 * | 12/2013 | Helie .................... B29D 11/00 |
| | | 428/195.1 |
| 2014/0083986 A1 | 3/2014 | Zhang et al. |
| 2017/0291850 A1 * | 10/2017 | Wada .................. C03C 23/0025 |
| 2017/0326688 A1 * | 11/2017 | Turner ................ B23K 26/382 |
| 2019/0040024 A1 | 2/2019 | Smith et al. |
| 2019/0283176 A1 | 9/2019 | He et al. |

OTHER PUBLICATIONS

Garcia-Giron et al, "Liquid-Assisted Laser Ablation of Advanced Ceramics and Glass-Ceramic Materials", Applied Surface Science, vol. 363, Feb. 2016, pp. 548-554.

Liu et al., "Effect of Surface Tension on a Liquid-Jet Produced by the Collapse of a Laser-Induced Bubble Against a Rigid Boundary"; Optics & Laser Technology; vol. 41, Issue 1, Feb. 2009, pp. 21-24.

Zhu et al, "Laser Ablation of Solid Substrates in Water and Ambient Air", Journal of Applied Physics, vol. 89, Issue 4, Jan. 30, 2001, pp. 2400-2403.

* cited by examiner

LIQUID-ASSISTED LASER MICROMACHINING SYSTEMS AND METHODS FOR PROCESSING TRANSPARENT DIELECTRICS AND OPTICAL FIBER COMPONENTS USING SAME

CROSS-REFERENCE TO RELATED APPLICATIONS

This application claims the benefit of priority under 35 U.S.C. § 119(e) of U.S. Provisional Application Ser. No. 62/622,265, filed on Jan. 26, 2018, and which is incorporated by reference herein.

U.S. Pat. No. 6,990,285, is incorporated by reference herein.

FIELD

This disclosure generally pertains to systems and methods for processing transparent dielectrics with a laser, and more particularly pertains to liquid-assisted laser micromachining systems and methods for processing transparent dielectrics and optical fiber components formed using the systems and methods.

BACKGROUND

Precision machining of materials is needed for many applications. Precision machining allows for the formation of miniature features in materials. Such features include holes, slots, grooves, and chamfers. Traditional techniques for precision machining involve mechanical methods (e.g., cutting, sawing, drilling, and scoring) or chemical methods (e.g., etching).

Adaptation of traditional techniques to more demanding applications, however, has proven to be challenging. There is increasing demand for machining finer features and for forming features in a wider variety of materials. There is currently great interest in the precision machining of hard dielectric materials and in forming high aspect ratio features with a high degree of precision. Computer numerical control (CNC) machining, for example, has challenges in drilling holes with a diameter smaller than 100-200 µm in glass, especially when the aspect ratio exceeds 10-20.

Laser ablation in air (dry ablation) is an alternative process for machining hard materials and has been demonstrated in a range of glasses and crystals. In dry laser ablation, a high intensity laser is directed to the surface of a material and the energy of the laser is sufficient to break bonds and release matter from the surface. Thermal effects associated with dry laser ablation, however, are disadvantageous for many applications. Thermal effects often lead to surface damage (e.g. oxidation, melting, cracking and stresses) and other effects that limit the resolution of machining. Thermal effects also lead to surface roughness, irregularities or non-uniformities in the dimensions of features formed by dry laser ablation, and to reduced mechanical strength of separated parts due to induced surface flaws. Thermal effects can also limit the ability to form multiple precise features in close proximity to each other, due the radius of affected material around the laser ablation region. Much of the matter released by the laser also remains as debris on the surface. Thus, the accuracy/precision of such a process is limited to 10 to 20 microns at best. The re-deposition of the debris on the walls of the laser-machined features preclude achieving aspect ratios of 10 or more.

Liquid-assisted laser micromachining is an alternative technique designed to overcome the limitations of dry laser ablation. In liquid-assisted laser micromachining, the working surface of the material is placed in contact with a liquid. The presence of the liquid-assist medium increases the rate of heat removal from the material to minimize deleterious thermal effects. This enables multiple precise features to be formed in close proximity to each other. The liquid-assist medium also provides a medium for sweeping away debris formed by the laser and prevents re-deposition of released matter on the surface. Shorter processing times are also possible for liquid-assisted laser micromachining relative to dry laser ablation.

Water is the most common liquid-assist medium used for liquid-assisted laser micromachining. Water has a high thermal conductivity and efficiently removes heat from the surface. The use of water as the liquid-assist medium results in less surface roughness than a dry ablation process but more surface roughness than a liquid-assist medium with a lower surface tension liquid.

Some photonic devices utilize an optical fiber inserted into or through a hole in a transparent glass or crystal substrate. Control of the hole to within a tolerance better than 0.25 µm permits precise positioning of an optical fiber, i.e., to within design and performance specifications. If the RMS (root-means square) roughness of the inside surface of the hole exceeds 0.5 µm, an optical fiber cannot be inserted in the hole without damaging (e.g. scratching or breaking) the fiber. If the hole diameter is increased to avoid damage, the fiber fits loosely in the hole and is susceptible to motion or misalignment in practical applications.

In data centers, optical fiber components in the form of optical guiding devices, optical support members and optical interconnection devices (connectors) and optical interconnection assemblies (connector assemblies) are used to manage optical fibers carried by optical fiber cables, which can carry hundreds or thousands of optical fibers. Handling such large-cross-section, high-stiffness cables with the length of up to 2 km is very difficult, so shorter cable pieces that require splicing are used. Joining such a large number of optical fibers by fusion splicing produces joints with very low optical loss, but it is expensive because of the time required. It is desirable to have less time-consuming process to connect a large number of fibers. Multi-fiber connectors with 12, 16, 24, or 32 single-mode optical fibers are available. Connectors for a higher number of fibers present extreme technical challenges. One such challenge is the need to have a precision optical fiber array in which a large number of optical fibers (e.g. 96) are held in precise positions, with position errors smaller than 1 micrometer. Another challenge is related to the need of aligning the height of the optical fibers relative to a ferrule endface where submicron accuracies are desired.

SUMMARY

An embodiment of the disclosure is directed to a method of processing a substrate having a substrate body made of a transparent dielectric material and having first surface and an opposite working surface. The method comprises: disposing the working surface to be in contact with a liquid-assist medium that comprises fluorine; forming from a pulsed laser beam a focused laser beam and directing the focused laser beam through the first surface and the opposite working surface to form a focus spot having an initial position in the liquid-assist medium; moving the focus spot over a motion path from the initial position in the liquid-assist medium through the substrate body in a general direction from the working surface to the first surface to create a modification of the transparent dielectric material that defines a core portion of the body; and removing the core portion from the body of the substrate to form a feature in the substrate.

In an example, the feature comprises either a through-hole or a blind hole having a diameter of less than 200 microns, an aspect ratio of greater than 10 and an interior surface with a root-mean square (RMS) roughness of less than 0.8 microns or less than 0.5 microns.

Another embodiment of the disclosure is a method of forming in a substrate having a body made of a transparent dielectric material a fiber hole for operably supporting at least one optical fiber having a fiber axis. The method comprises: interfacing a second surface of the substrate with a liquid-assist medium; forming from a focused laser beam a focus spot at an initial position within the liquid-assist medium, wherein the focused laser beam comprises light pulses having a time duration in the range from 1 picosecond to 50 picoseconds; moving the focus spot over a substantially spiral motion path from the initial position into the body of the substrate through the second surface and generally towards a first surface that is opposite to the second surface to create a modification in the transparent dielectric material that defines a core portion of the body; and removing the core portion from the body to define the fiber hole in the substrate sized to operably support an optical fiber.

Another embodiment of the disclosure is a fiber guide member for supporting one or more optical fibers each having a fiber axis, comprising: a glass substrate having a body that defines front and back surfaces; one or more fiber holes formed in the glass substrate, wherein each fiber hole has a central hole axis and includes a flexible gripper that runs along at least a portion of a length of the fiber hole, the flexible gripper having a receiving area and being configured to grip the optical fiber when the optical fiber is inserted into the receiving area. The flexible grippers can have a C-shaped gripping member or two or more gripping fingers configured receive and hold (grip) an optical fiber inserted into the receiving area so that the optical fiber axis is substantially coaxial with the hole axis of the fiber hole.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

Figure 1A:
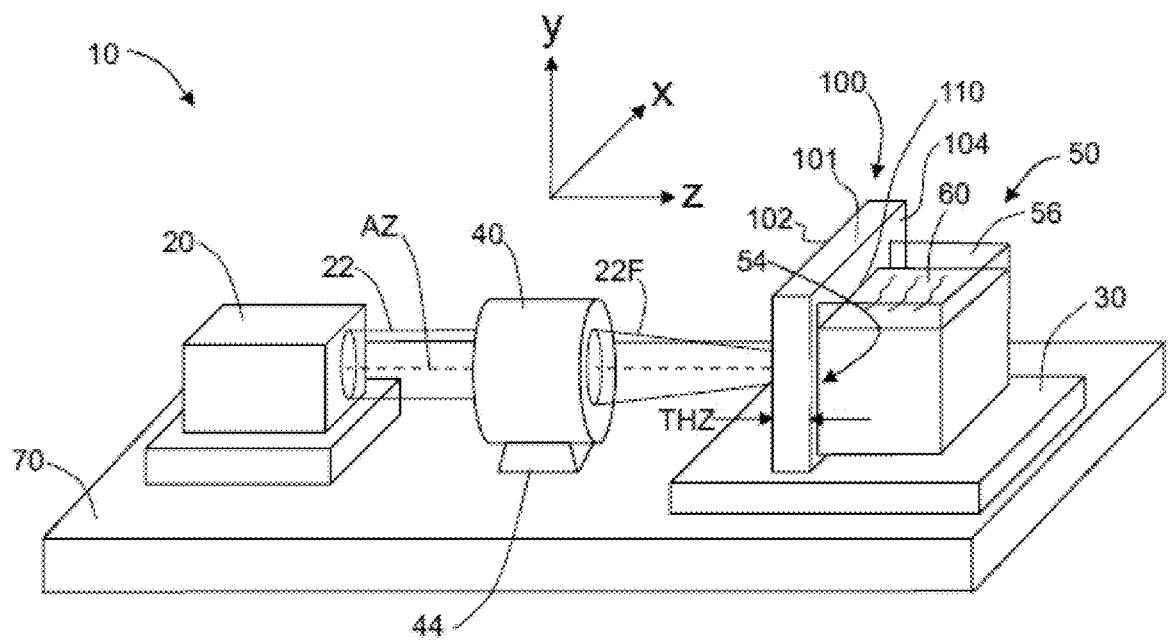
FIG. 1A is a schematic elevated view of an example liquid-assisted laser-based micromachining system for processing a transparent dielectric to form an optical interconnection devices as disclosed herein.

The embodiments set forth in the drawings are illustrative in nature and not intended to be limiting of the scope of the detailed description or claims. Whenever possible, the same reference numeral will be used throughout the drawings to refer to the same or like feature. The drawings are not necessarily to scale for ease of illustration an explanation.

DETAILED DESCRIPTION

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Definitions and Explanation of Select Terms

The following definitions and explanations regarding certain terms apply to the specification and claims that follow.

"Include," "includes," or like terms means encompassing but not limited to, that is, inclusive and not exclusive.

The term "consists of" or "consisting of" and like terms are understood as being a special case of the more general term "comprising" or "comprises," so that the expression "A comprises B" and like expressions also includes "A consists of B" and like terms as a special case.

The terms "downstream" and "upstream" are used to describe positions of objects relative to a direction of light travel, so that A upstream (downstream) of B means that light is incident upon A before (after) B.

The indefinite article "a" or "an" and its corresponding definite article "the" as used herein means at least one, or one or more, unless specified otherwise.

As used herein, the aspect ratio of a feature refers to the ratio of a linear dimension of the feature normal to the incident surface to the smallest linear dimension of the feature orthogonal to the linear dimension of the feature normal to the incident surface.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but are otherwise joined to each other through one or more intervening elements. Elements in contact may be rigidly or non-rigidly joined. Contacting refers to placing two elements in direct or indirect contact. Elements in direct (indirect) contact may be said to directly (indirectly) contact each other.

As used herein, a material is "transparent" to a wavelength of light if the internal transmission of light at the wavelength is greater than 80%. Preferably, the internal transmission is greater than 90%, or greater than 95%. As used herein, internal transmission refers to transmission exclusive of reflection losses.

As used herein, "working surface" refers to a surface of a substrate in contact with a liquid-assist medium in a liquid-assisted laser micromachining process.

An "optical fiber component" is any element or assembly that is used to operably support at least one optical fiber. Example optical fiber components include optical fiber guide members, optical fiber support members and optical fiber interconnection devices.

Cartesian coordinates are used in some of the Figures for reference and ease of explanation and are not intended to be limiting as to direction and/or orientation.

The abbreviation μm is short for micron or micrometer, which is $10^{-6}$ meter. The abbreviation μm and the term micron are used interchangeably herein.

The claims as set forth below are incorporated into and constitute part of this Detailed Description.

Liquid-Assisted Laser-Based Micromachining System

Figure 1B:
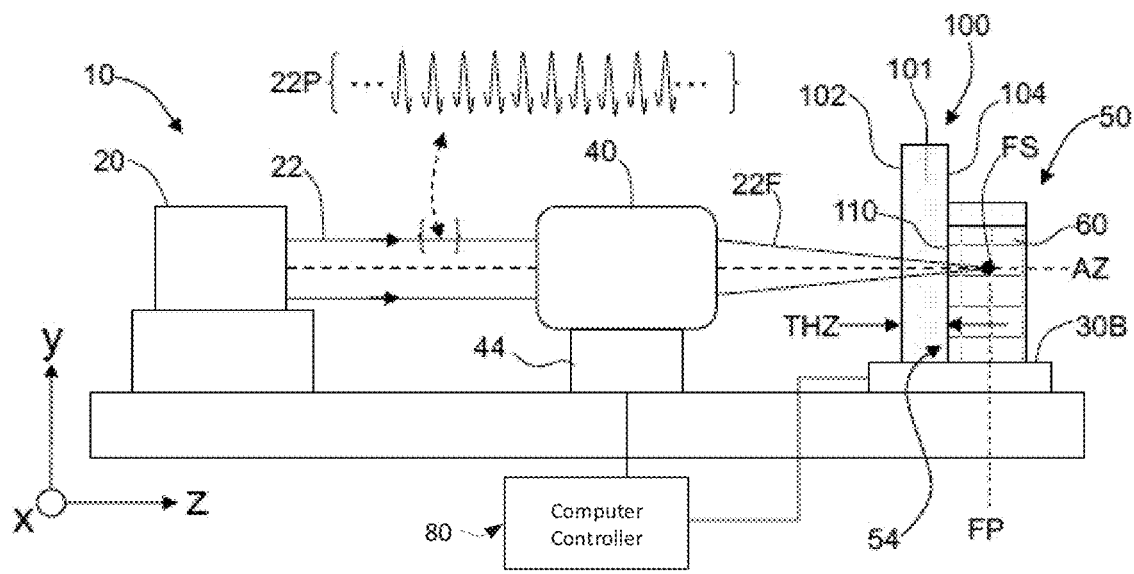
FIG. 1B is a side view of the liquid-assisted laser-based micromachining system of FIG. 1A.

FIG. 1A is a schematic elevated view of an example liquid-assisted laser-based micromachining system ("system") 10 for processing a transparent dielectric to form an optical interconnection device for optical fibers as disclosed herein. FIG. 1B is a schematic side view of the system of FIG. 1A. The system 10 includes a laser source 20, which produces a substantially collimated laser beam 22 that passes in a direction of propagation along a system axis AZ that runs in the z-direction. In an example, the laser source 20 can include beam collimating optics (not shown) to form the substantially collimated laser beam 22.

The wavelength of the laser source 20 can be any wavelength at which the dielectric material of the substrate 100 is transparent. Typical laser wavelengths for common substrates are in the UV, visible, or infrared portions of the electromagnetic spectrum. Representative laser wavelengths include wavelengths in the range from 325 nm-1700 nm, or in the range from 400 nm-1500 nm, or in the range from 500 nm-1250 nm, or in the range from 700 nm-1100 nm.

The laser beam 22 comprises a train of laser pulses 22P. The duration of the laser pulses 22P can vary over a range extending from the femtosecond (fs) regime to the picosecond (ps) regime to the nanosecond (ns) regime. Representative pulse durations are in the range from 1 fs-100 ns, or in the range from 5 fs-10 ns, or in the range from 10 fs-1 ns, or in the range from 100 fs-100 ps, or in the range from 1 ps-10 ps. In some aspects, shorter laser pulses 22P are preferable to longer laser pulses. While not wishing to be bound by theory, it is believed that surface roughness is higher when longer laser pulses 22P are used because longer laser pulses have higher threshold pulse energies for ablation and lead to ablation of larger pieces of matter from the working surface than shorter laser pulses. On the other hand, longer laser pulses 22P allow for higher material removal rate. Based on these considerations, picosecond laser pulses provide a good combination of low surface roughness and high material removal rates.

In another example, the laser beam parameters comprise: a pulse length for the light pulses 22P in the range from 1 to 50 ps; a laser pulse energy in the range from 10 μJ to 100 μJ; a repetition rate in the range from 1 kHz to 1 MHz or in the range from 1 kHz to 500 KHz; a focus spot size DS (defined below) in the range from 2 μm to 10 μm; a wavelength in the range from 1 μm to 2 μm; and a laser beam (or cuvette) translation speed in the range from 0.1 mm/s to 10 mm/s.

The system 10 also includes a focusing optical system 40 downstream of the laser source 10 and along the system axis AZ. The focusing optical system 40 can comprise one or more optical elements such as one or more focusing lenses or focusing optics. In an example, the focusing optical system 40 can also include one or more elements that provide beam conditioning (e.g., spatial filtering, wavelength filtering, etc.) and can also include one or more elements for beam steering (e.g., rotatable mirrors, etc.). The focusing optical system 40 has a focal length FL, a numerical aperture NA and clear aperture CA. In an example, the focusing optical system 40 is operably supported by a movable stage 44 that allows for beam steering as explained below.

The system 10 also includes a cuvette 50 having an interior 56 configured to contain a liquid-assist medium 60, which in an example comprises water or consists essentially of water. Other example liquid-assist media are discussed below. In an example, the cuvette 50 is operably supported by a movable precision x-y-z stage 30 that can move the cuvette in the x, y and z directions in precise increments. In an example, the system 10 only includes the movable precision stage 30 and the laser source is substantially stationary (e.g., is movable for coarse alignment). In an example, the laser source 20, the focusing optical system 40 and the cuvette 50 are operably supported by a support base 70 such as an optical bench or like stable platform. In an example shown in FIG. 1B, a computer controller 80 is operably connected to the movable precision x-y-z stage 30 and the optional movable stage 44 to control the movement of one or both of the movable precision stages in operating the system 10 to carry out the micromachining methods described herein. The cuvette 50 has an open side 54 whose purpose is described below.

The system 10 is configured to process a transparent dielectric substrate 100 having a body 101 that defines a front surface 102 and a back surface 104. The transparent dielectric substrate 100 comprises a dielectric material, and in examples comprises a glass material, a glass-ceramic material or a crystalline material. In an example, the transparent dielectric substrate comprises sapphire. Example glasses include oxide glasses and non-oxide glasses. Preferred glasses are silica glasses, including alkali silica glasses and alkaline earth silica glasses. Glasses include glasses strengthened by ion exchange or thermal tempering. Example crystals include oxide crystals, such as metal oxides, and non-oxide crystals. Example glasses can include soda-lime glasses, alkaline earth boro-aluminosilicate, alkali-aluminosilicate glass, and Corning IriS™ glass.

In an example, the transparent dielectric substrate (hereinafter, "substrate") 100 is rectangular and substantially planar with substantially parallel front and back surfaces 102 and 104 and a substantially constant thickness THZ. Other shapes for the substrate 100 can also be employed, and the rectangular and planar substrate is shown by way of example and for ease of illustration and explanation. In an example, the thickness THZ of the substrate 100 in the z-direction is at least 0.1 mm or at least 0.2 mm or at least 0.5 mm.

The substrate 100 is disposed in system 100 so that the back surface 104 is in direct contact with the liquid-assist medium 60 of the cuvette 50 at the open side 54. In an example, the substrate 100 is also supported by the movable precision x-y-z stage 30 so that the substrate and cuvette 50 move together.

In the operation of the system 10 to carry out the micromachining methods disclosed herein, the substrate 100 is moved into a desired position relative to the system axis AZ using the movable precision x-y-z stage 30. Once in position, the laser source 20 is activated to form the substantially collimated beam 22, which is received by the focusing optical system 40. The focusing optical system 40 forms from the substantially collimated beam 22 a focused laser beam 22F that is focused to a focus spot FS at a focus position FP along the system axis AZ. The focus spot FS has a diameter defined by a Gaussian beam waist, which in an example can be in the range from 1 micron to 5 microns. The focus spot FS also has an associated Rayleigh length, which in an example is in the rage from 1.6 microns to 20 microns. An exemplary focus spot diameter is 2 microns and an exemplary Rayleigh length is 6.5 microns for applications where the substrate 100 has the form of a thin sheet of glass.

Figure 2A:
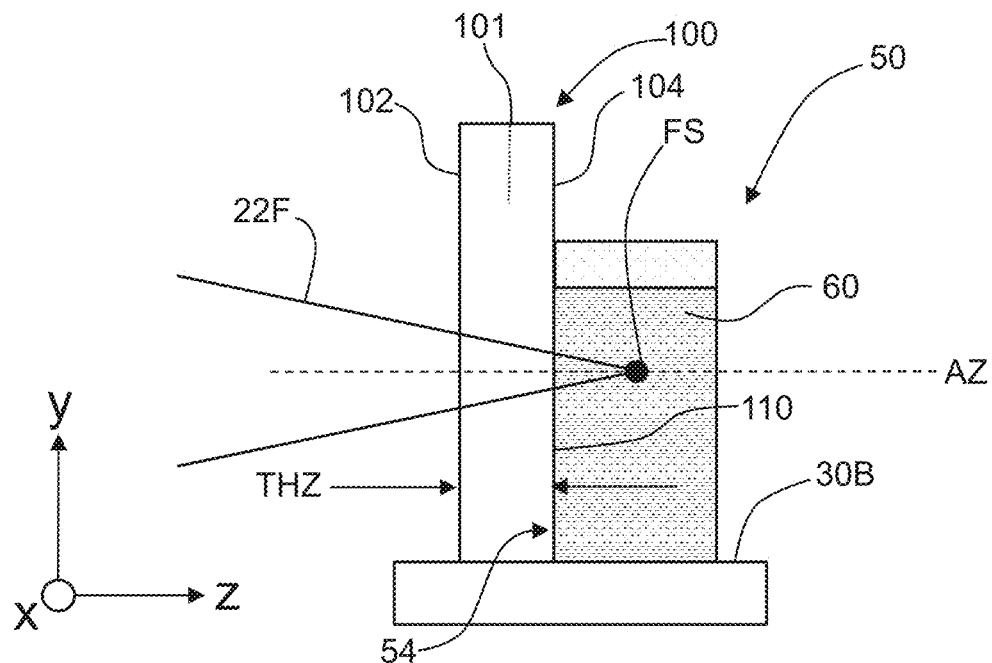
FIG. 2A is a close-up view of the substrate and the cuvette showing an initial focus positon of the focus spot within the liquid-assist medium and adjacent the interface between the liquid-assist medium and the back (working) surface of the substrate.

In an example, the focused laser beam 22F initially passes through the substrate 100 and forms the focus spot FS within the liquid-assist medium 60. FIG. 2A is a close-up view of the substrate 100 and the cuvette 50 showing an initial focus position FP of the focus spot FS within the liquid-assist medium 60 and adjacent the interface 110.

The focus spot FS is subsequently moved forward to be at or near an interface 110 defined by the back surface 104 (hereinafter, working surface 104) and the liquid-assist medium 60, e.g., in the liquid-assist medium within ~10 μm of the interface. The focus spot FS has sufficient intensity to alter the structure of the material that makes up the body 101 of the substrate to define a modification 121 to the material that structurally weakens the material.

Figure 2B:
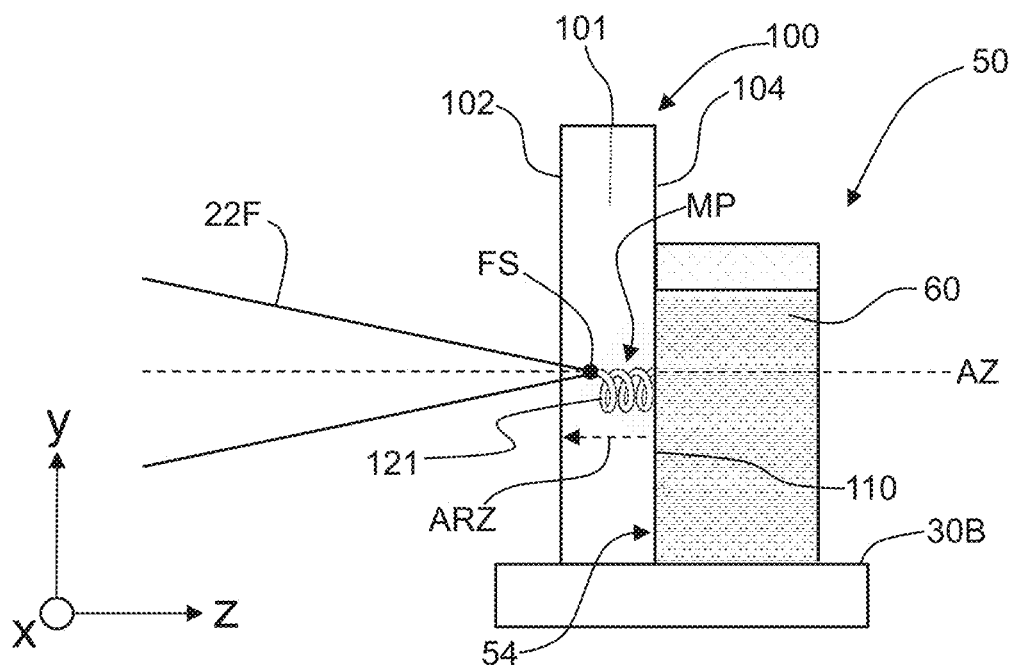
FIG. 2B is similar to FIG. 2A and shows the motion path of the focus spot used to form a helical modification to the material that constitutes the body of the substrate as part of the process of forming a feature in the substrate.

Next, the laser source 20 and/or the substrate 100 and cuvette 50 can be translated in the x, y and/or z directions to control the position of the focal spot FS and the shape of the feature 120 formed in body 101 of the substrate 100. Likewise, the movable stage 44 of the focusing optical system 40 can be used to steer the focused light beam 22F. FIG. 2B is similar to FIG. 2A and shows an example modification 121 in the process of being formed by moving the focus spot FS along a helical motion path MP that includes a z-component as indicated by the arrow ARZ. In an example, the helical motion path MP can have a pitch in the range from 0.1 μm to 30 μm.

The lateral dimensions of the modification 121 can be controlled through motion of the focus spot FS over the motion path MP in the x and y directions and the depth of the feature can be controlled by movement of the focus spot over the motion path in the z direction. The dimensions of the modification 121 can also be controlled by varying the position of the focus spot FS of focused laser beam 22F. The modification 121 is ultimately used to form at least one feature in the substrate 100, as explained below.

Thus, in an example, the formation of the modification 121 begins at the working surface 104 and continues through the body 101 in the direction of the front surface 102.

In one embodiment, formation of the modification 121 includes ablation of the material that makes up the body 101 of the substrate 100. As material is removed from the working surface 104, the liquid-assist medium 60 from the cuvette 50 flows to occupy the evacuated space to maintain a wetted surface for heat removal and further micromachining. Micromachining at different depths relative to the working surface 104 is achieved by moving the focus spot FS of the focused laser beam 22F (either through variation in the focusing optical system 40 or relative motion of the laser and working surface) in the direction from the working surface 104 toward the front surface 102 of the substrate 100 over a select motion path MP. The modifications 121 can be formed in the body 101 of the substrate 100 having depths varying from a partial thickness THZ of the substrate to the full thickness of the substrate. In an example, the size (diameter) of the focus spot FS is selected to facilitate the flow of the liquid-assist medium 60 through the micromachined regions 153 that define a tube-like modification 121.

Figure 2C:
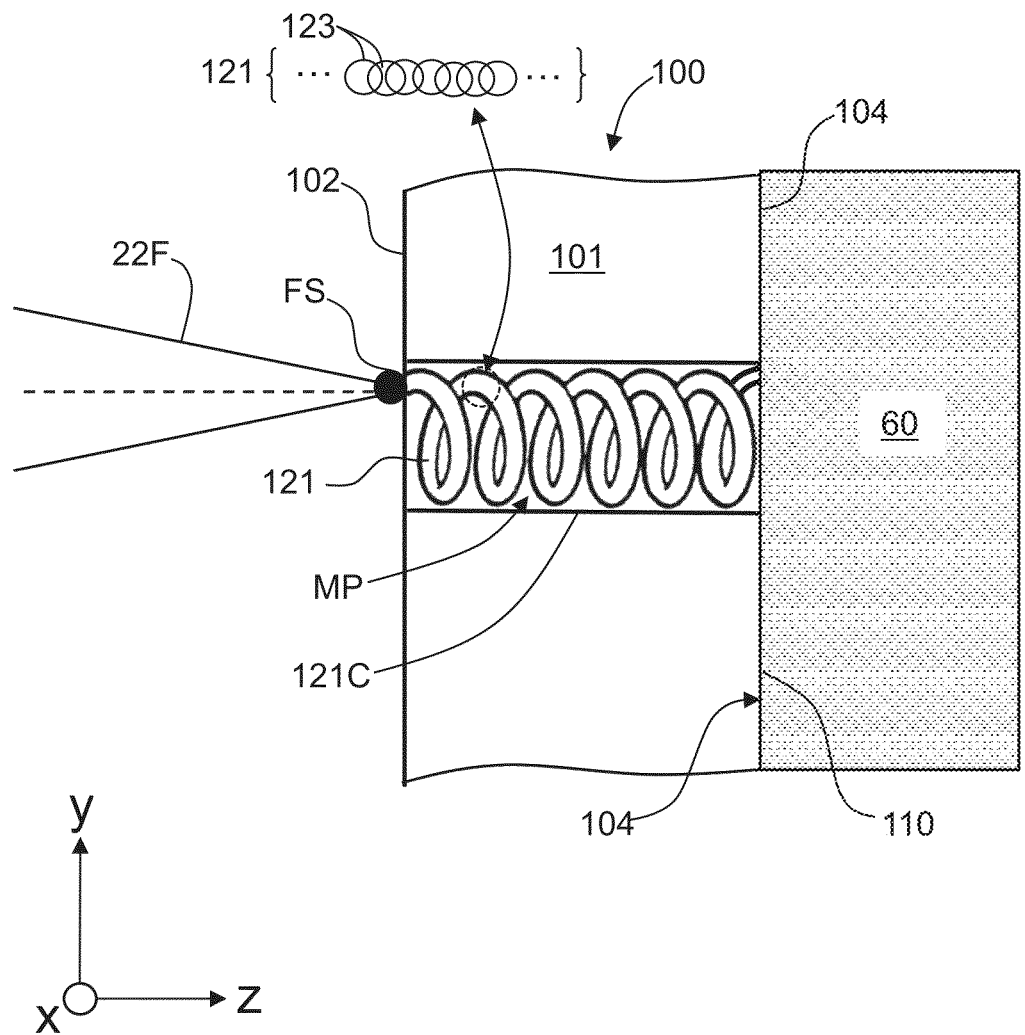
FIG. 2C is similar to FIG. 2B and shows the final helical modification and the resulting core portion defined by the final helical modification, with the close-up inset showing example micromachined regions that constitute the modification.

FIG. 2C is a close-up view of the irradiated portion of the substrate 100 showing the completed formation of the example of a helical modification 121 formed in the body 101 of the substrate 100 by ablation by the focus spot FS moving over the example helical motion path MP of FIG. 2B. Just the liquid-assist medium 60 of the cuvette is shown for ease of illustration. Localized micromachining occurs in the vicinity of each position of the focus spot FS within the body 101 of the substrate 100 when forming the modification 101. For the helical feature 121, a helical arrangement of micromachined regions 123 is formed in the body 101 of the substrate 100, as shown in the close-up inset I1. The micromachined regions 123 define the modification 121 and constitute regions of mechanical weakness which represent a trajectory for separation of the modification 121 from the rest of the body 101 of the substrate 100. Thus, in an example, the modification 121 can comprise micromachined regions 123 in the form of microcavities created by ablation and that form contiguous channels within the material that makes up the body 101 of the substrate 100.

Figure 2D:
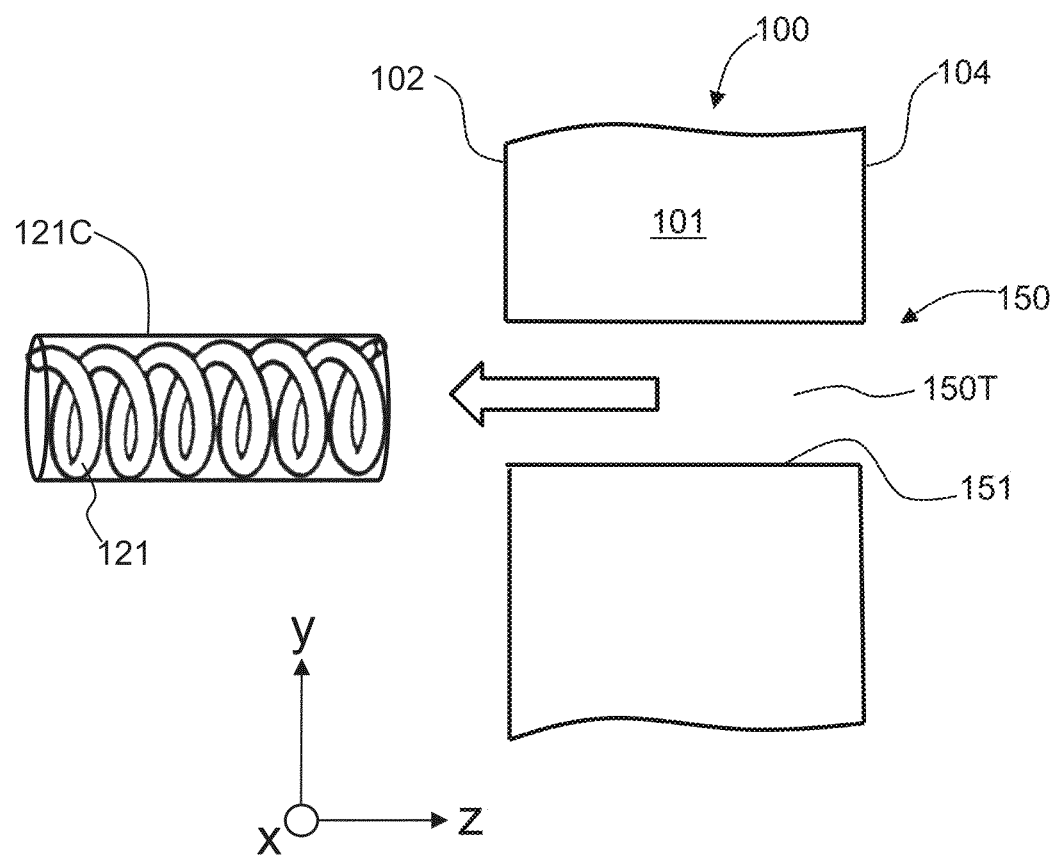
FIG. 2D is similar to FIG. 2C and shows the removal of the core portion to define a feature in the substrate in the form of a through hole.

FIGS. 2C and 2D are close-up views of a portion of the substrate 100 and illustrate how a feature 150 in the form of a through hole 150T can be fabricated in the body 101 by moving the focus spot FS over a helical motion path MP so that the micromachined regions that define the modification 121 extend through the thickness THZ of the body, as shown in FIG. 2D. FIGS. 2C and 2D show a core portion 121C of the body 101 as defined by the modification 121, wherein in FIG. 2D, the core portion is separated from the rest of the body 101 to form a feature 150 in the through-hole feature 150T. The feature 150 has an interior surface 153.

Thus, with reference again also to FIGS. 1A and 1B, in an example of the operation of the system 10, the focused laser beam 22F passes through the body 101 of the substrate 100 so that the focus spot FS resides in the liquid-assist medium 60 adjacent the interface 110 as shown in FIG. 2A. The micromachining occurs in a −z direction, i.e., counter to the +z direction of the focused light beam 22F. That is, relative to the direction of propagation of the focused light beam 22F, the working surface 104 is closer to the laser source 20 than the initial position of the focus spot FS, and micromachining occurs by moving the focus spot over the motion path MP that has a component in the −z direction, which is toward the working surface 104 and the laser source 20.

In an alternative embodiment, relative to the direction the focused light beam 22F, the working surface 104 is farther from the laser source 20 than the initial position of the focus spot FS and micromachining occurs by moving the focus spot FS over a motion path MP that has a component in the +z direction, i.e., toward the working surface 104 in the direction of beam propagation of the focused light beam 22F. In this embodiment, the working surface 104 corresponds to the surface of incidence of the laser beam to the substrate 100. This embodiment can be visualized with respect to the embodiments of the system 10 of FIGS. 1A and 1B by rotating the cuvette 50 by 180° about the y-axis so that the substrate 10 becomes the rear surface of the cuvette instead of the front surface of the cuvette, where the rear surface is farther from the laser source 20 than the front surface along the direction of beam propagation of the focused light beam 22F.

As noted above, a given modification 121 can be used to form a given feature 150, and multiple features can be used to form an array of features. The modifications 121 can have a variety of shapes to form a corresponding variety of features 150. Features 150 other than holes can be similarly fabricated by controlling the motion path MP of the focus spot FS relative to the body 101 of the substrate 100 to form a pattern of two or more ablated regions having a shape consistent with a desired modification 121. Cross-sectional shapes of features 150 include circular, elliptical, round, square, and rectangular. Example features 150 can extend through the entire thickness THZ of the substrate 100 to form through holes 150T such as shown in FIG. 2D, or alternatively extend through a fraction of the thickness of the substrate. Generally, the features 150 can include grooves, channels, recesses, holes and slots having arbitrary cross-sectional shapes.

The features 150 can have relatively smooth interior surfaces. The features 150 are formed by using the focus spot FS of the focused laser beam 22F laser to remove portions of the material from the body 101 of the substrate. A preferred mechanism of material removal includes laser ablation and material removal through acoustic shock generated by cavitating bubbles.

To avoid heating and melting of the substrate 100, linear absorption of the focused laser beam 22F by the substrate is minimized and ablation is instead effected by non-linear optical absorption. Non-linear optical absorption occurs in transparent materials when the intensity of the laser exceeds an intensity threshold. The intensity of the laser beam 22 can be controlled by adjusting the power of the laser source and/or the focusing the laser beam by the focusing optical system 40. Non-linear optical absorption is a multiphoton absorption process that has an absorption coefficient that increases with increasing intensity. The high intensity and tight focusing of the focused laser beam 22F lead to strong non-linear absorption in a highly localized region of the material allowing for dimensional control of features 150 with precision/accuracy of 0.5 microns or smaller. The conditions can be controlled to provide absorbed energy that is sufficiently high to directly evaporate a portion of the substrate 100 without proceeding through a melting transition. Thermal effects during laser micromachining are further minimized when using pulsed lasers with laser pulses 22P having a pulse duration less than about 100 ps, or less than about 50 ps, or less than about 25 ps. Ablation through non-linear absorption provides a mechanism for removing material from the substrate 100 and enables the formation of a select modification 121 via patterning or formation of fine features in the material that makes up the body 101 of the substrate 100.

As material is dry-ablated from the substrate 100, debris can form and accumulate on the front surface 102 or on the interior surface 153. When forming features 150 in the form of through holes 150T, for example, debris accumulates within the hole. The debris is difficult to remove and can interfere with the ablation process by, for example, scattering the laser beam and preventing attainment of the localized intensity needed for non-linear absorption. To aid removal of debris, liquid-based laser micromachining can be performed as described above. As ablation occurs, the liquid-assist medium 60 displaces debris from the working surface 104 to prevent accumulation of the debris and to provide holes and other features free of clogs. The liquid-assist medium also removes heat from the working surface 104, as noted above. In an example, the liquid-assist medium assists in pushing the core portion 121C out of the body 101 of the substrate.

The Use of Water as the Liquid-Assist Medium

Water is one of the preferred liquid-assist media 60 for liquid-assisted laser micromachining and high ablation rates have been reported for water-assisted laser micromachining processes. When forming a hole in a substrate, in a water-assisted laser micromachining process, although debris is removed, the resulting interior surface of the hole can be rough and non-uniform. Rough surfaces are undesirable because they interfere with insertion of objects into the hole and promote cracking or other damage of the surrounding material.

While not wishing to be bound by theory, it is believed that cavitation phenomena that occur in liquid-assisted laser micromachining lead to acoustic-shock forces at the working surface that cause damage or roughness of the working surface or surfaces of features formed in the working surface. In liquid-assisted laser micromachining, the focus spot FS of the focused laser beam 22F is positioned at the interface 110 or in the liquid-assist medium at a position near the interface of the liquid-assist medium 60 close to the working surface 104 of the substrate 100 (e.g. in the liquid-assist medium 60, to within about 10 μm to 50 μm of the working surface).

The intensity of the laser beam 22 at and near the focus spot FS needs to be sufficiently high to enable non-linear optical absorption in the material that makes up the substrate body 101. The intensity of the focused light 22F at the focus spot FS leads to optical breakdown of the substrate material and the formation of a plasma. During irradiation with a laser pulse 22P at the focus spot FS, the plasma expands rapidly. When the laser pulse 22P terminates, the plasma relaxes and cools. Relaxation of the plasma is accompanied by rapid release of energy into the liquid-assist medium and formation of a cavitation bubble in the liquid. Due to pressure gradients associated with cavitation, the cavitation bubble migrates to the working surface 104 of the substrate. The bubble is unstable and collapses. Upon collapse of the cavitation bubble, a shock wave develops and a high-speed liquid jet forms. The shock wave from the collapsing bubble causes increased roughness, while the liquid jet acts to quickly remove material.

When water is used as the liquid-assist medium 60, the effects of cavitation forces on the working surface 104 of a substrate are strong due to high surface tension of water and the surface roughness of features formed in water-assisted laser micromachining is increased because acoustic shock force increases with the surface tension of the liquid. Examples of the present disclosure are directed to liquid-assist media for liquid-assisted laser micromachining that minimize cavitation forces and produce features in substrates that have relatively smooth surfaces with low roughness, e.g., lower than that formed by using water as the liquid-assist medium.

Micromachining Experiments Using a Fluorine-Based Liquid-Assist Medium

Besides water, preferred liquids for the liquid-assist medium 60 that contain fluorine which are some of the lowest surface tension liquids. Such liquid-assist media are referred to herein as fluorine-based liquid assist media or more simply as fluorinated liquids (i.e., liquids that at least partially comprise fluorine). The examples shown below illustrate that fluorinated liquids are eminently suited for use in liquid-assisted laser micromachining. Features 150 formed when using a fluorinated liquid-assist medium as the liquid-assist medium 60 in system 10 have relatively smooth (interior) surfaces with low roughness. Examples of suitable fluorinated liquids include fluorinated alkanes, fluorinated alcohols, and fluorinated amines. Representative fluorinated liquids include the Fluorinert® series of liquids (e.g. FC-70, FC-40, FC-770), fluorinated hexane, fluorinated octane, perfluorodecalin, and fluorinated trialkylamines. The degree of fluorination ranges from monofluorinated to fully fluorinated. The amount of fluorine in the fluorinated liquid-assist medium is greater than 30 wt %, or greater than 40 wt %, or greater than 50 wt %, or greater than 60 wt %, or greater than 70 wt %, or in the range from 30 wt %-80 wt %, or in the range from 40 wt %-70 wt %.

Fluorinated liquids with high boiling points are preferred. During micromachining, the liquid-assist medium is heated due to absorption in the liquid-assist medium 60 of the laser focus spot FS, which has an intensity sufficient to induce optical breakdown and plasma formation through non-linear optical absorption. If the liquid-assist medium 60 has a low boiling point, the heating can be sufficient to induce boiling. Boiling leads to formation of bubbles. If bubbles increase to dimensions above the feature size (e.g. diameter of a hole) and stick to the feature 150 (e.g. opening of a hole), they can block access of the liquid-assist medium to the feature and prevent the liquid-assist medium from removing debris.

The inability of a liquid-assist medium 60 to access recessed portions of a feature 150 also precludes wetting of interior surfaces 151 by the liquid- assist medium, thus preventing removal of heat from interior surfaces by the liquid-assist medium. It is therefore desirable to minimize bubble formation by avoiding boiling. The boiling point of the fluorinated liquid-assist medium 60 is preferably greater than 100° C., or greater than 125° C., or greater than 150° C., or greater than 175° C., or greater than 200° C., or in the range from 100° C.-225° C., or in the range from 125° C.-200° C.

Fluorinated liquids with a relatively low surface tension are preferred as the liquid-assist medium. It is believed that low surface tension reduces the magnitude of cavitation forces to facilitate formation of features with low surface roughness. The surface tension of the fluorinated liquid-assist medium 60 at 25° C. is preferably less than 70 dynes/cm, or less than 55 dynes/cm, or less than 40 dynes/cm, or less than 30 dynes/cm, or less than 20 dynes/cm, or in the range from 10 dynes/cm-70 dynes/cm, or in the range from 10 dynes/cm-50 dynes/cm, or in the range from 10 dynes/cm-30 dynes/cm.

Figure 3A:
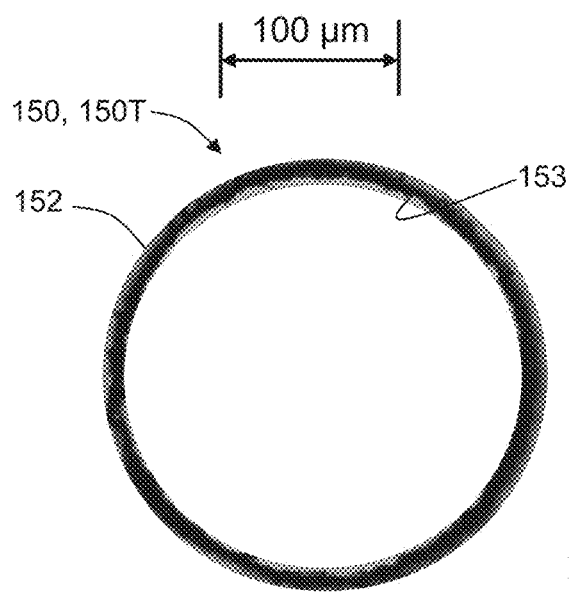
FIGS. 3A and 3B show annular portions of reproductions of photographic images of example through-hole features formed in an example glass substrate using the liquid-assisted laser micromachining systems and methods described herein with water as the liquid-assist medium (FIG. 3A) and with a fluorinated liquid as the liquid-assist medium (FIG. 3B).
Figure 3B:
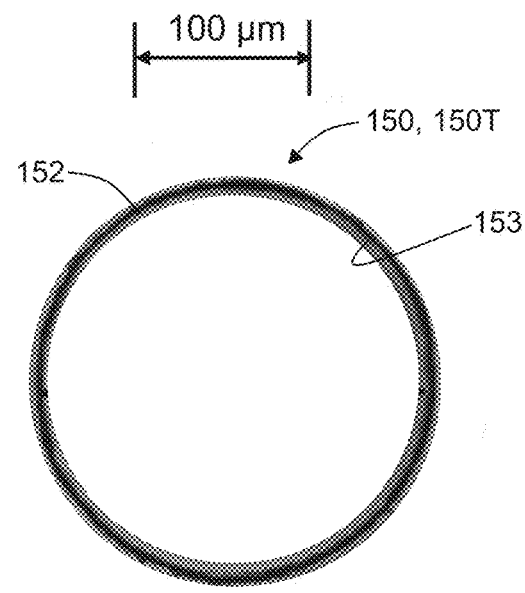

FIGS. 3A and 3B show the annular portions 152 of reproductions photographic images of through-hole features 150T formed in substrate 100 made of glass and using the liquid-assisted laser micromachining systems and methods described above with water as the liquid-assist medium (FIG. 3A) and a fluorinated liquid-assist medium (FIG. 3B). The glass substrate 100 had a thickness THZ of 0.6 mm thick. The glass material was Eagle XG® glass, available from Corning Incorporated, Corning, N.Y. The laser source 20 utilized a pulsed laser operating at a wavelength of 1030 nm with a 10 ps pulse duration, a 200 kHz repetition rate, and an average power of 2 W. A 100 µm scale is shown for reference. The diameter of each of the holes 150T is just over 200 µm.

The glass substrate 100 was interfaced with the open side 54 of the cuvette 50 as described above to define the interface 110. The cuvette 50 had internal dimensions of 45 mm×40 mm×35 mm and was filled to a depth of about 30 mm with the liquid-assist medium 60. As noted above, in the example of FIG. 3A, deionized water was used as the liquid-assist medium 60 while the fluorinated liquid-assist medium for the example of FIG. 3B was Fluorine™ FC-70, which has the formula $N((CF_2)_4CF_3)_3$, (available from Sigma-Aldrich, St. Louis, Mo.). Except for the liquid-assist medium 60, the processing conditions were the same for the two samples of glass substrate 100. The through-hole features 150T were fabricated by moving the focus spot FS over a helical motion path MP to form a helical modification 121 comprising an arrangement of ablated micromachined regions 123 in the body 101 of the glass substrate 100, as described above.

The initial location of the focus spot FS was in the liquid-assist medium 60 approximately 100 µm behind the working surface 104. The focus spot FS was then moved over the helical motion path MP having a diameter of approximately 200 µm and a pitch of 3 µm to 5 µm. The z-component of the movement of the focus spot FS was toward the front surface 102 of the glass substrate 100. The through-hole features 150T were formed by removing the resulting core portion 121C of glass body 101 subtended by the helical modification 121. Typically, the core portion 121C spontaneously separates during processing to form the through-hole feature 150T. Compressed air or washing in a stream of liquid-assist medium can optionally be used to facilitate removal of core portion 121C after processing. For each sample, the through-hole feature 150T has a diameter D of 200 µm, the depth of the hole was 0.6 mm (i.e., equal to the thickness THZ of the glass substrate 100), and the aspect ratio of the through-hole feature was 3:1.

The results shown in FIGS. 3A and 3B indicate that use of a fluorinated liquid-assist medium 60 produces features 150 having smoother interior surfaces than the use of water as the liquid. The roughness of the interior surface of the hole formed when using water is much higher than the roughness of the interior surface of the hole formed when using a fluorinated liquid. The variability in the diameter of the hole is accordingly much higher when using water than when using a fluorinated liquid. The use of a fluorinated liquid-assist medium 60 in system 10 and the laser micromachining methods carried out therein is discussed in greater detail below.

The reduction in roughness and enhanced uniformity in cross-sectional dimensions obtained using a fluorinated liquid-assist medium 60 is surprising and counterintuitive because water has a much higher thermal conductivity than the fluorinated liquids contemplated herein. The thermal conductivity of water at 20° C. is 0.6 W/m-K, while the thermal conductivity of Fluorinert™ FC-70 at 20° C. is 0.070 W/m-K. Other fluorinated liquids contemplated herein also have much lower thermal conductivity than water. One would accordingly expect more efficient heat transfer during ablation when using water as the liquid-assist medium relative to using Fluorinert™ FC-70 or other fluorinated liquid-assist medium as the liquid-assist medium. Since thermal effects are known to deteriorate surface quality in laser micromachining processes, one would expect improved surface quality in materials processed by liquid-assisted laser micromachining using water as the liquid-assist medium relative to using Fluorinert™ FC-70 or other fluorinated liquid-assist medium as the liquid-assist medium.

The RMS (root-mean-square) roughness of feature surfaces formed by liquid-assisted laser micromachining when using a fluorinated liquid-assist medium as the liquid-assist medium is estimated to be less than 0.5 µm. When using water as the liquid-assist medium, the expected RMS roughness is in the range from 0.5 µm to 1 µm.

The decreased surface roughness obtained by using a fluorinated liquid-assist medium 60 in system 10 enables the fabrication of processed substrates 100 having features 150 with more uniform dimensions. When forming features 150 having a cross-section with a linear dimension, the variability in the linear dimension attributable to surface roughness is less than 1.0 µm, or less than 0.8 µm, or less than 0.6 µm, or less than 0.4 µm, or in the range from 0.2 µm-1.0 µm, or in the range from 0.2 µm-0.8 µm, or in the range from 0.2 µm-0.6 µm, or in the range from 0.2 µm-0.5 µm. As used herein, variability in linear dimension refers to the difference between the maximum and minimum value of the linear dimension. It should be noted that other process limitations (e.g. stability of the laser, precision of positioning of the laser) may contribute to variability in linear dimensions independent of the contribution from surface roughness. Linear dimensions include length, width, height, depth, and diameter.

When forming circular features 150 (e.g. circular holes), for example, the variability in diameter attributable to RMS surface roughness is less than 1.0 µm, or less than 0.8 µm, or less than 0.6 µm, or less than 0.5 µm, or less than 0.4 µm, or in the range from 0.2 µm-1.0 µm, or in the range from 0.2 µm-0.8 µm, or in the range from 0.2 µm-0.6 µm, or in the range from 0.2 µm-0.5 µm. As used herein, variability in diameter refers to the difference between the maximum diameter and minimum diameter mean square deviation of a circular feature from an ideal circle.

In one aspect, features 150 having a high aspect ratio are formed by liquid-assisted laser micromachining using a fluorinated liquid-assist medium 60 in system 10. For a feature 150 in the form of a hole 150T with a circular cross-section, the aspect ratio corresponds to the ratio of the depth of the hole (a dimension normal to the incident surface) to the diameter of the hole (a dimension orthogonal to the depth of the hole). For a hole with a square cross-section, the aspect ratio corresponds to the ratio of the depth of the hole (a dimension normal to the incident surface) to the side length of the hole (a dimension orthogonal to the depth of the hole). For a hole with a rectangular cross-section, the aspect ratio corresponds to the ratio of the depth of the hole (a dimension normal to the incident surface) to the smaller of the side length or side width of the hole (a dimension orthogonal to the depth of the hole). For a hole with an elliptical cross-section, the aspect ratio corresponds to the ratio of the depth of the hole (a dimension normal to the incident surface) to the length of the minor axis of the hole (a dimension orthogonal to the depth of the hole).

In some embodiments, the aspect ratio is greater than 2:1, or greater than 4:1, or greater than 6:1, or greater than 8:1, or greater than 10:1, or in the range from 2:1-20:1, or in the range from 3:1-15:1, or in the range from 4:1-10:1.

The present disclosure encompasses substrates 100 having features with roughness, variability in linear dimension, and/or aspect ratio described herein. Substrate products formed by liquid-assisted laser micromachining of substrates 100 using a fluorinated liquid-assist medium 60 using system 10 are within the scope of the present disclosure. In one aspect, the feature 150 extends through a thickness THZ of the substrate 100 and the product is in the form of an optical fiber support device that can support an optical fiber inserted in the feature, as described below.

Figure 4A:
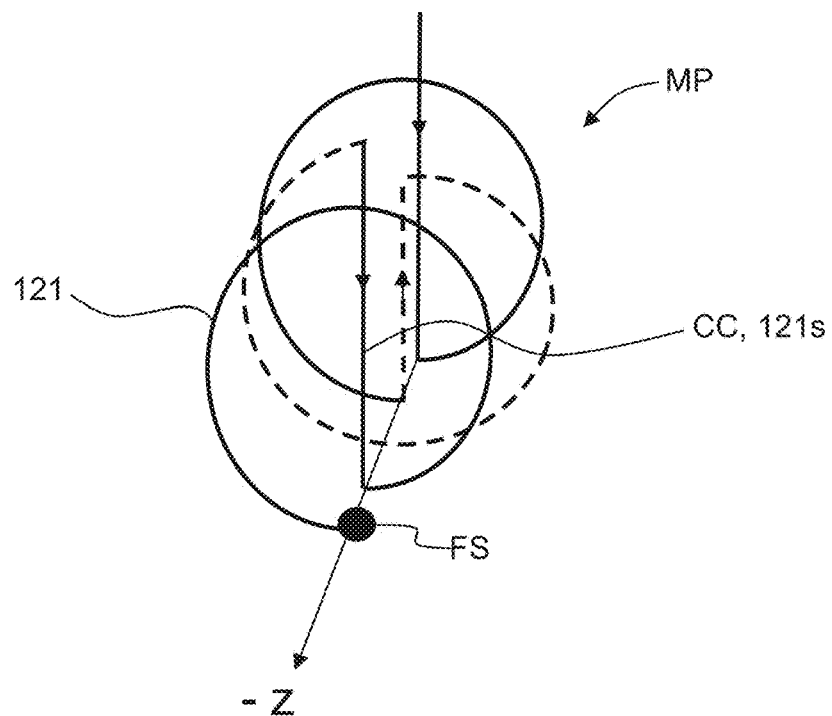
FIG. 4A is a schematic illustration of an example of a motion path having a quasi-helical or spiral form that includes a cross-cut portion.
Figure 4B:
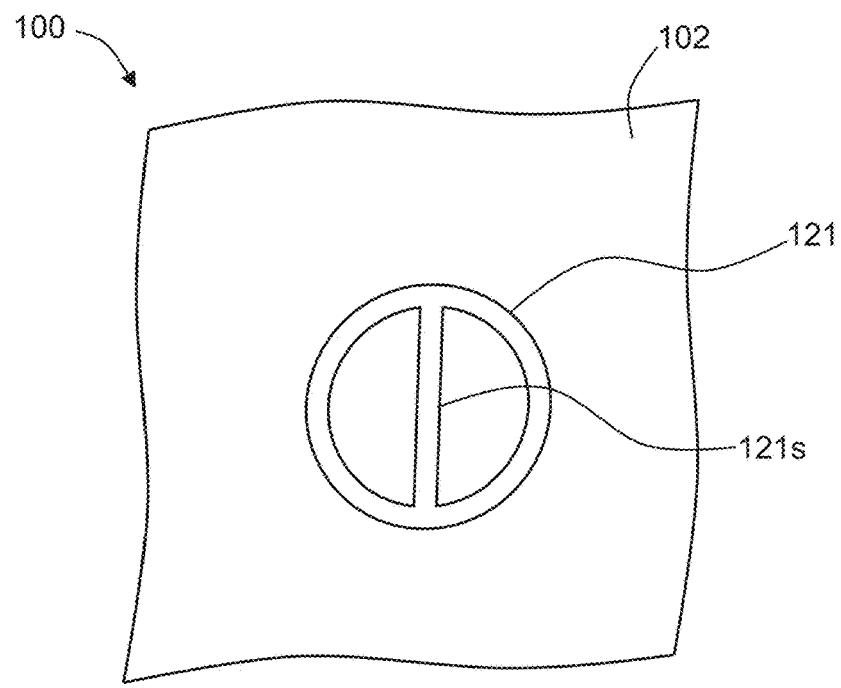
FIG. 4B is a top-down close-up view of an example portion of a processed substrate showing the resulting modification formed by the modified helical motion path of FIG. 4A.

FIG. 4A is a schematic illustration of an example of a motion path MP having a quasi-helical or spiral form that includes a cross-cut portion CC. FIG. 4B is a top-down view close-up view of an example portion of a processed substrate 100 showing the resulting modification 121 formed by the modified helical motion path of FIG. 4A. The cross-cut portion CC in the motion path MP forms a cross channel or slot 121s that enhances the flow of the liquid-assist medium 60 into the feature 121 during the laser-based micromachining process.

Optical Fiber Components

As discussed above, embodiments of the disclosure are directed to methods of forming optical fiber components by processing the substrate 100 using system 10. An aspect of the disclosure includes the optical components themselves as products formed by the liquid-based micromachining methods (processes) disclosed herein that are carried out using the system 10. Examples of such optical fiber components are set forth below.

Optical Fiber Guide Member and Guiding Device

In an embodiment, the substrate 100 can be processed as described above to form one or more through holes 150T configured to facilitate efficient guiding of one or more optical fibers. In this embodiment, the substrate 100 constitutes an optical fiber guide member or "guide member," and such through-holes are referred to as "fiber through-holes" 150TF.

Figure 5A:
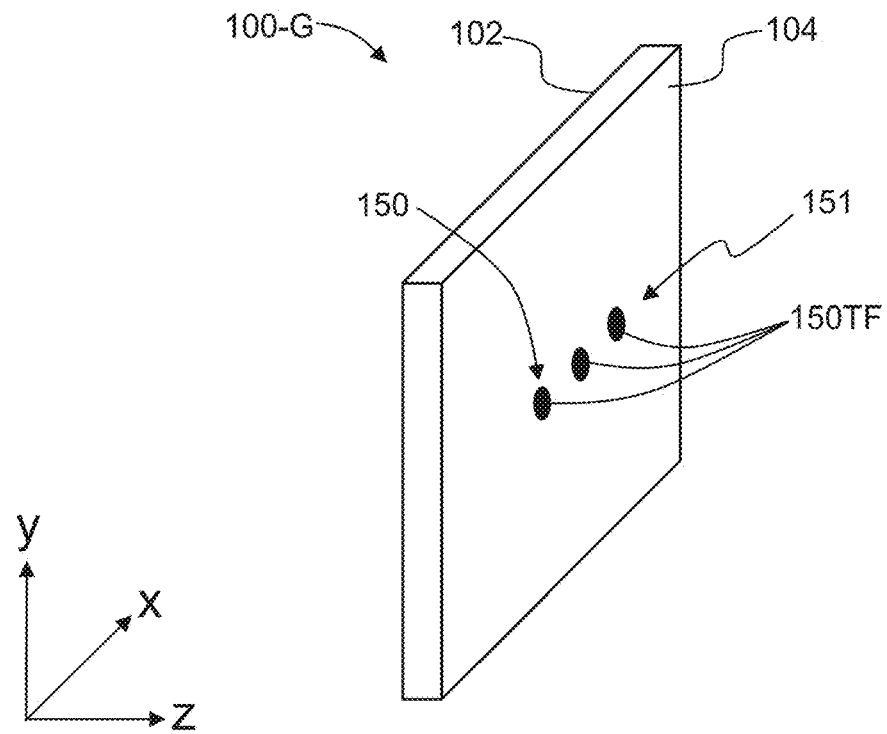
FIG. 5A is a back elevated view of an example guide member that includes an array of features in the form of three fiber through-holes arranged in a row along the x-direction.
Figure 5B:
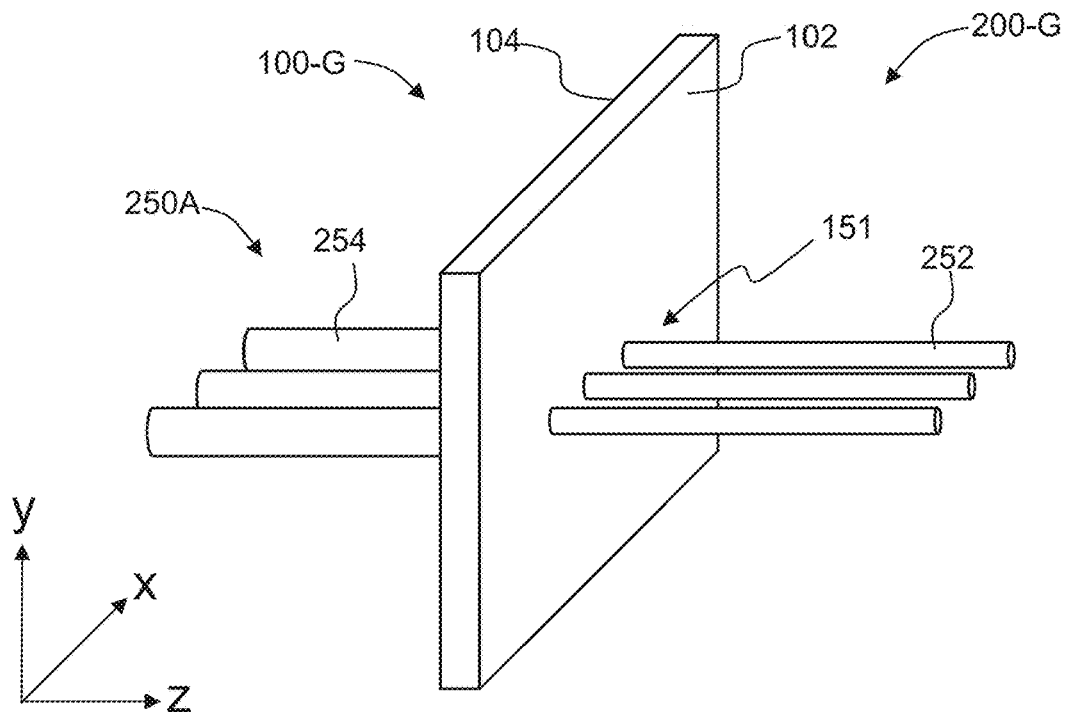
FIG. 5B is similar to FIG. 5A and shows an example optical fiber guiding device ("guiding device") that comprises the guide member of FIG. 5A and an array of three optical fibers that respectively extend through the three fiber through-holes.

FIG. 5A is a back elevated view of an example guide member 100-G that includes an array 151 of features 150 in the form of three fiber through-holes 150TF arranged in a row along the x-direction. FIG. 5B is similar to FIG. 5A and shows an example optical fiber guiding device ("guiding device") 200G that comprises the guide member 100-G of FIG. 5A and an array ("fiber array") 251 of three optical fibers ("fibers") 250 that respectively extend through the three fiber through-holes 150T. Each fiber 250 includes a bare section 252 (which can be bare glass or include a non-glass coating) and a buffered section 254 defined by protective jacket (e.g., a polymer jacket) 256. In one example, the fiber through-holes 150TF are sized to closely accommodate the buffered section 254 while in another example the through-holes are size to closely accommodate the bare section 252. The fiber array 251 can comprise multiple rows and/or columns and generally can have a variety of configurations and number of fibers 250 useful for optical fiber applications.

Optical Fiber Interconnection Members and Devices

In an embodiment, the substrate 100 can be processed as described above to form an array 151 of fiber through-holes 150TF configured to facilitate efficient optical coupling between two optical fibers 250. In this embodiment, the substrate 100 constitutes an optical fiber interconnection member or "interconnect member," and is referred to hereinafter as 100-I.

Figure 6A:
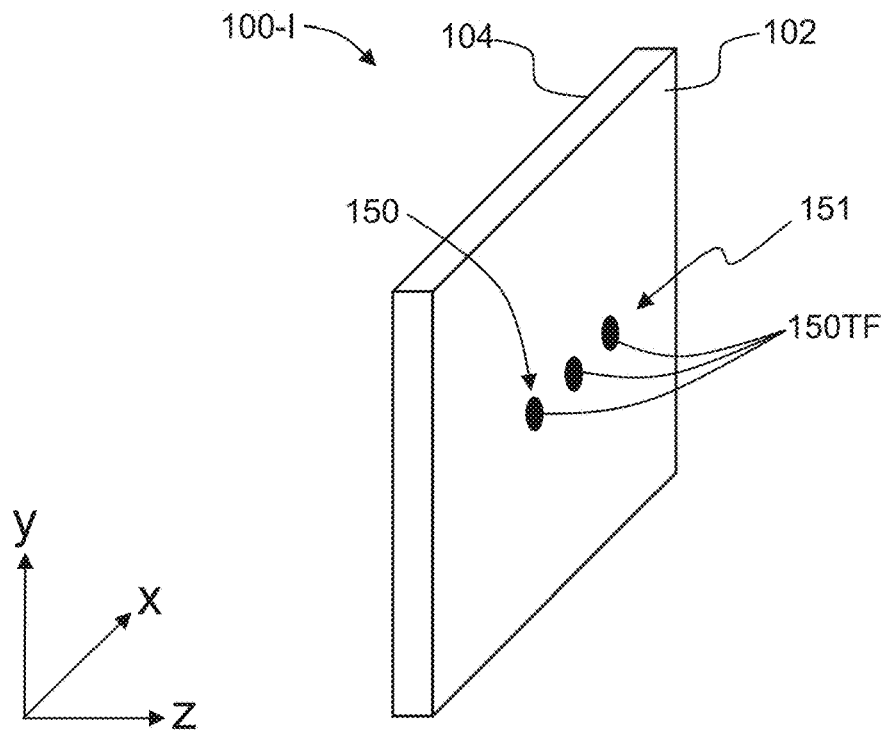
FIG. 6A is a back elevated view of an example interconnect member that includes an array of features in the form of three fiber through-holes arranged in a row along the x-direction.

FIG. 6A is a back elevated view of an example interconnect member 100-I that includes an array 151F of three features 150 in the form of fiber through-holes 150TF arranged in a row along the x-direction and configured to facilitate optical coupling between two fibers 250.

Figure 6B:
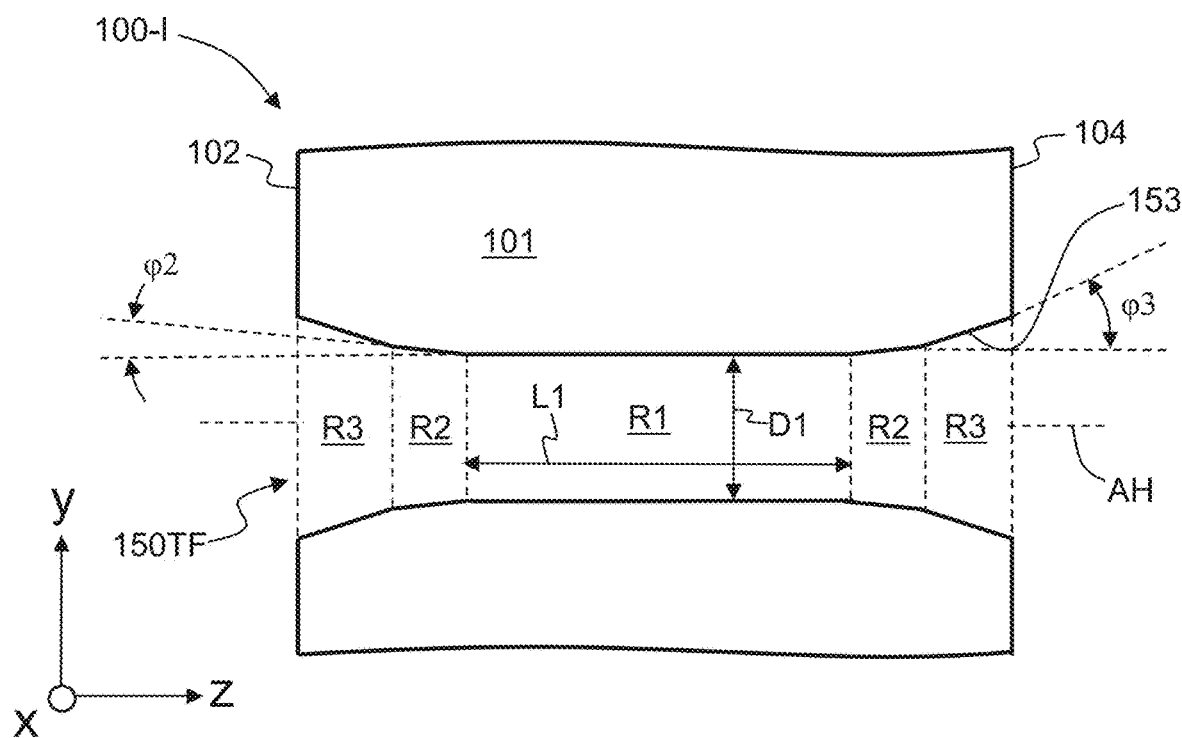
FIG. 6B is close-up y-z cross-sectional view of an example fiber through-hole the interconnection member, wherein the fiber through-hole has three regions configured to facilitate optical coupling between two optical fibers.

FIG. 6B is a close-up y-z cross-sectional view of an example tapered fiber through-holes 150TF of the example interconnect member 100-I, wherein the fiber through-hole is configured to facilitate optical coupling of two fibers 250. The fiber through-hole 150TF comprises three regions denoted as R1, R2 and R3 and has a central hole axis AH.

The region R1 is a central region centered substantially midway between the front and back surfaces 102 and 104 and having a length L1 and the smallest size (diameter D1). The region R1 is formed so that the two fibers 250 to be optically coupled closely fit within this region to ensure end-to-end alignment of the two fibers for low optical loss. The size (diameter D1) of the central region R1 is tightly controlled, e.g., to within 1 micron or less of the target diameter and only slightly larger than a diameter DF of an optical fiber. In an example, the length L1 of region R1 is about 10.DF to ensure that optical fibers are held within the fiber through-hole 150TF, as shown and explained below. Note that FIG. 6B and subsequent related Figures are not to scale for ease of illustration.

The second region R2 sandwiches the central region R1 and is slightly larger than the central region R1 (e.g., 1 micron larger) but still small enough to maintain angular alignment of the two fibers 250 to be optically coupled. The second region R2 has an axial length L2. The slightly larger size (diameter) of second region R2 allows for the interior surface 153 of this region to be more rough than that of the central region R1. The second region R2 preferably has an outward taper or flare, i.e., a taper wherein the radius of the second region R2 increases in the direction away from the central region R1 to define a taper angle φ2. The length L2 is shorter than L1 and is a transition region between the central region R1 and the outermost region R3.

The third region R3 sandwiches the second region R2 and has an axial length L3 an outward taper with a taper angle φ3>φ2 so that the size of the fiber through-hole 150TF at the front and back surfaces 102 and 104 of the interconnect member 100-I is considerably larger than the fiber diameter, e.g., 10 microns to 25 microns larger. The tapered configuration of the third region R3 acts as a funnel to guide the given fiber into fiber through-hole 150TF. The fiber through-hole 150TF thus constitutes a double-ended tapered fiber through-hole. The length L3 need only be long enough to facilitate inserting a fiber into the fiber through-hole 150TP.

Figure 6C:
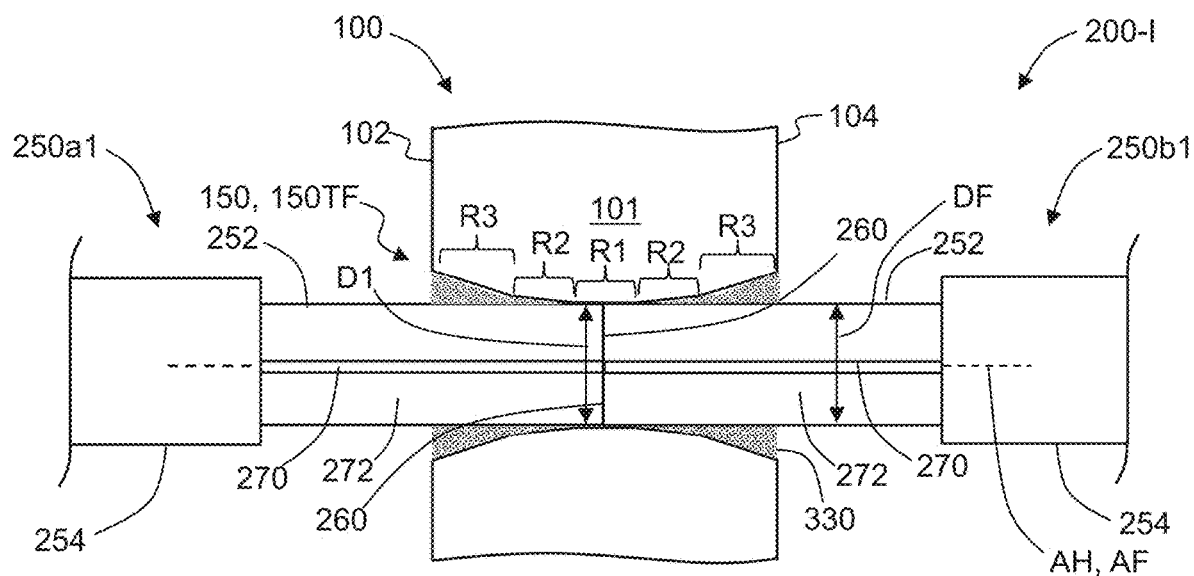
FIG. 6C is similar to FIG. 6B and shows two optical fibers interfaced (end coupled) within the fiber through-hole of the interconnection member, with the fiber end faces confronting or in contact within the central region of the fiber through-hole.

FIG. 6C is similar to FIG. 6B but showing two fibers 250, denoted 250a1 and 250b1, which are inserted into the fiber through-hole 150TF from the front side 102 and the back side 104, respectively, of the interconnect member 100-I. Each fiber 250 has a fiber axis AF, an end face 260, a core 270 and a cladding 272. The fiber end faces 260 are confronting in the central region R1 of the fiber through-hole 150TF and in an example are in contact. The fiber axes AF are also co-axial with the hole axis AH. A securing material 330 such as a UV-activated adhesive can be used to secure the fibers 250 within the fiber through-hole 150TF. In an example, the securing material has a relatively low viscosity so that it flows into and fills the gap between the fibers 250 and the interior surface 153. The scale of FIG. 6C is axially compressed relative to FIG. 6B for ease of illustration.

As described above, the tapered configuration of the fiber through-hole 150TF with the close-fitting central region R1 allows for both easy insertion of the fibers 250a1 and 250b1 into the fiber through-hole from opposite sides while also providing for close optical alignment of the respective cores 70 of the two fibers. In an example, a glass substrate 100 with a thickness TH of 2 mm IRIS™ glass (available from Corning, Incorporated, Corning, N.Y.) as processed using system 10 to form a precision fiber through-hole 150TF having the three-region configuration of FIG. 6B. Two standard single mode optical fibers 250 (250a1 and 250a2) were inserted into the fiber through-hole from opposite sides so that their respective end faces 260 were confronting and in contact within the central region R1 of the fiber through-hole 150TF to establish end-to-end (butt) optical coupling, as shown in FIG. 6C. A light source was operably connected to the remote end of one of the single mode fibers 250 and an optical detector was operably connected to the remote end of the other single mode fiber and a measurement of the optical coupling loss was made and measured at 0.24 decibel (dB).

The variation in the diameters of the different regions R1, R3 and R3 of the tapered fiber through-hole 150TF can be selected to be less than two times the laser cutting kerf (focus spot width) so that after laser processing as described above to form the core portion 121C, the core portion can be removed from the body 101 of the interconnect member 100-I.

Figure 6D:
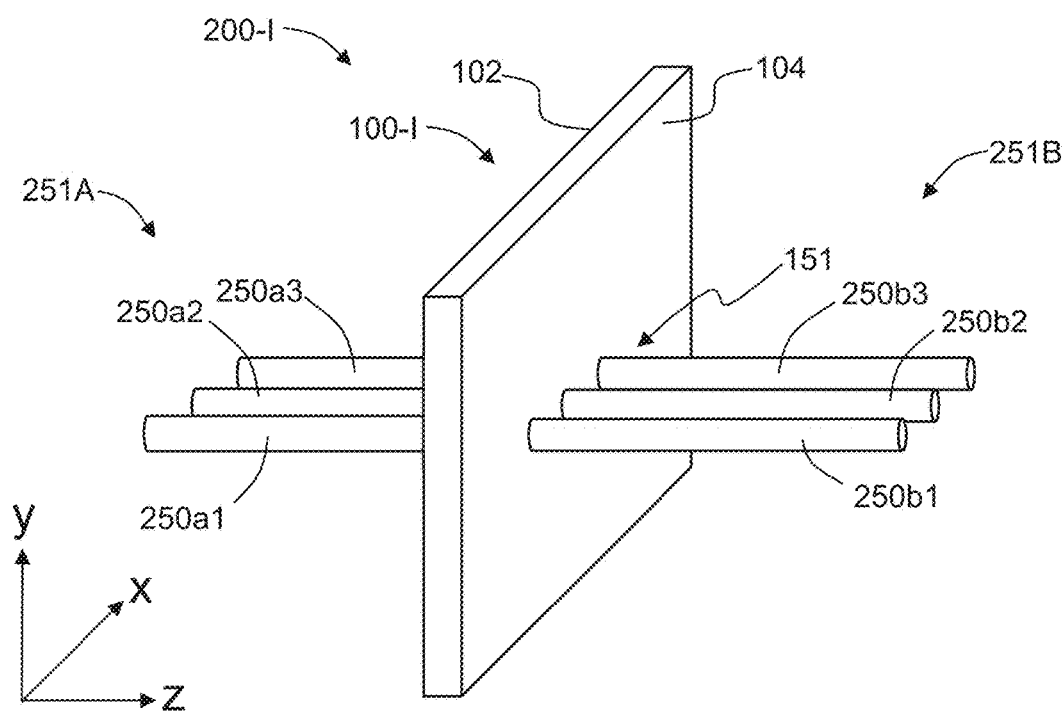
FIG. 6D is a back elevated view of an example optical fiber interconnection device ("interconnection device") that comprises the interconnection member of FIG. 6A and three pairs of optical fibers.

FIG. 6D is similar to FIG. 6A and shows an example optical fiber interconnection device 200I that includes a first array 251A of optical fibers 250 (250a1, 250a2, 250a3 optically coupled to a second array 251B of optical fibers 250 (250b1, 250b2, 250b3) using the three fiber through-holes 150TF of the interconnect member 100-I. In an example, each fiber through-hole 150tF is configured as shown in FIG. 6B. Other configurations of the fiber through-holes 150TF, including cylindrical, can also be employed.

FIG. 6C is similar to FIG. 6A and shows an example optical fiber interconnection device ("interconnection device") 200 that comprises the interconnect member 100-I of FIG. 5A and two (first and second) fiber arrays 251A and 251B. The first fiber array 250A contains three fibers 250a1, 250a2 and 250a3 while the second fiber array 251B contains three fibers 250b1, 250b2 and 250b3.

Table 1 below sets forth example operating parameters for system 10 for forming the three regions R1, R2 and R3 for example tapered fiber through-hole 150TF of FIG. 6B.

TABLE 1

| Laser parameter | R1 | R2 | R3 |
|---|---|---|---|
| Laser pulse length (ps) | 1-50 | 1-50 | 1-50 |
| Laser pulse energy (uJ) | 20-50 | 20-70 | 20-100 |
| Laser pulses per second (kHz) | 10-1000 | 10-1000 | 10-1000 |
| Laser focus spot size (um) | 2-4 | 2-4 | 2-4 |
| Laser translation speed: (mm/s) | 0.1-1 | 0.2-2 | 0.2-2 |
| Spiral cut path pitch (μm) | 0.1-10 | 0.1-10 | 0.1-10 |

Table 1 shows that fiber through-holes 150TF with different diameter regions such as regions R1, R2 and R3 can be fabricated where the different regions are formed using different laser fabrication process parameters. For example, where high precision surfaces are needed (e.g., region R1) the laser writing process can be slowed down to create extremely smooth sidewall interior surfaces 151 where the diameter of the hole is well-controlled. In the other larger regions (e.g., R2 and R3), a faster laser writing process can be conducted that creates a rougher sidewall interior surface 153 with relaxed diameter tolerances. Using this approach, the overall machining time ("write time") of the fiber through-hole can be reduced. Thus, in an example, one or more of the following operational parameters are varied in system 10 to form the tapered fiber through-hole or the tapered fiber blind hole: the writing speed (i.e., speed of the focus spot FS over the motion path MP), the spiral pitch, the spiral diameter, the laser power, the pulse repetition rate, and the diameter of the focus spot FS.

Additional Guide Members and Guiding Devices

Figure 7A:
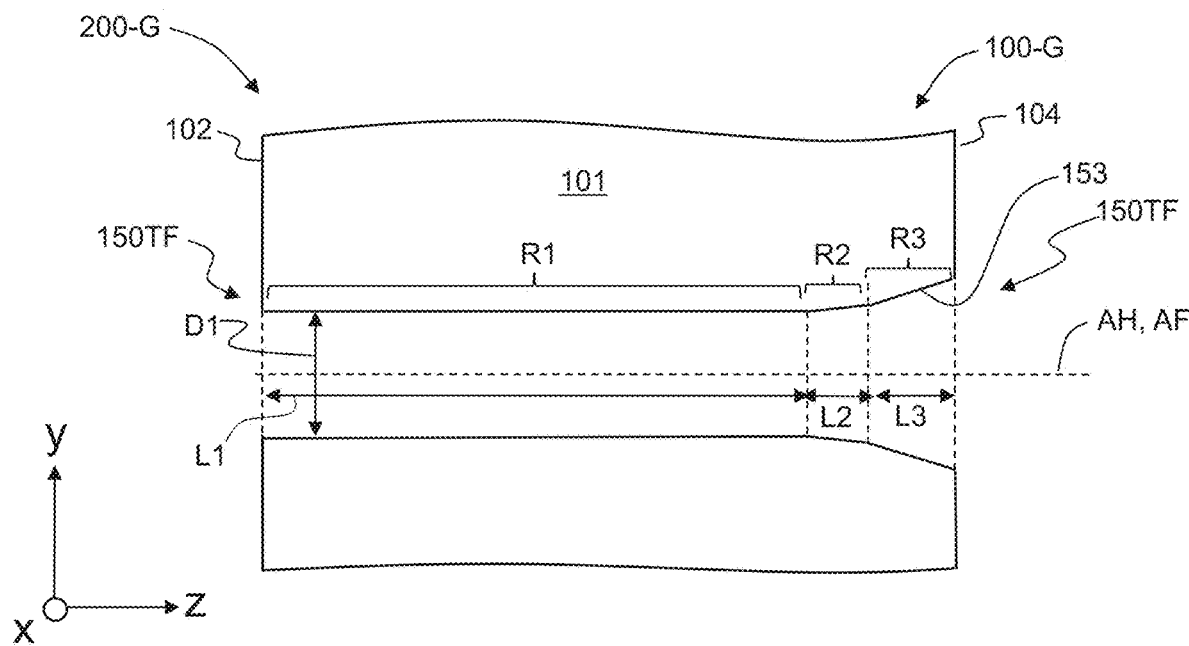
FIG. 7A is a close-up y-z cross-sectional view of an example tapered fiber through-hole of an example guide member.

FIG. 7A is a close-up y-z cross-sectional view of an example tapered fiber through-hole 150TF of an example guide member 100-G, wherein the region R1 is at the front surface 102, region R3 is at the back surface 104 and region R1 is sandwiched between regions R1 and R3. These regions R1 through R3 have the same general features and configurations as described above except that their locations have shifted. The configuration of this particular example fiber through-hole 150TF allows for an optical fiber 250 to be inserted into the fiber through-hole at the back surface 104 so that the fiber end face 260 resides at or near the front surface 102, as shown in FIG. 7B.

In an example, an end portion of the fiber 250 can be pushed through the fiber through-hole to extend beyond the front surface 102 of the guide member 100-G and into contact with a flat reference surface. The fiber 250 can be held in contact with the flat reference surface while the fiber 250 is secured within the fiber through-hole 150TF, e.g., using a securing material 330, such as a UV-activated adhesive (FIG. 7B). The reference surface can then be removed. This process can be carried out for an array of fibers 250 operably disposed in an array 151 of fiber through-holes 150TF. Further in an example, the fiber end portions can be polished, e.g., to form polished end faces 260 that coincide with the front surface 102 of the guide member 100-G.

Figure 7B:
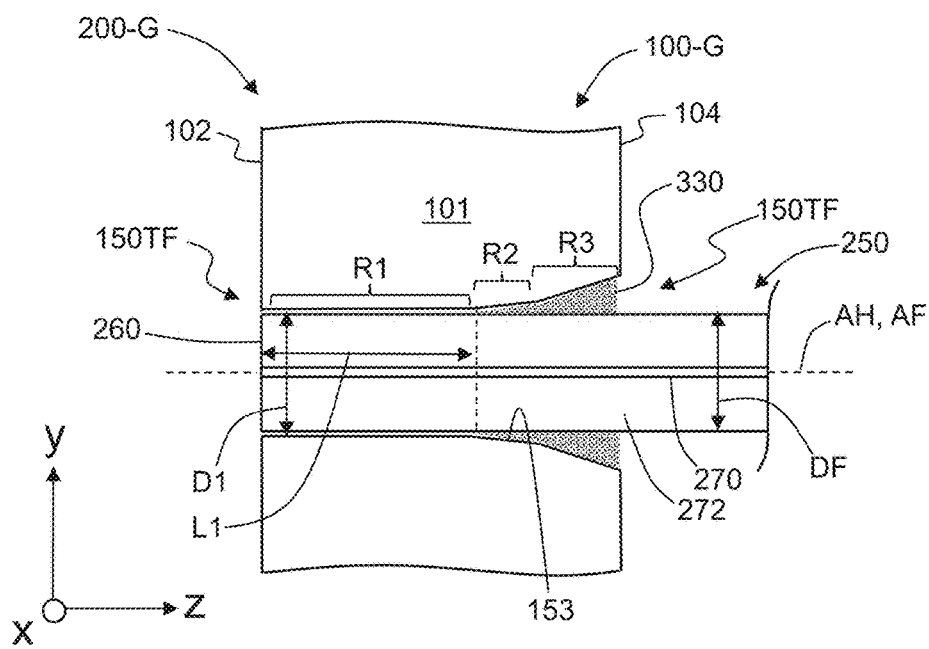
FIG. 7B is similar to FIG. 7A and shows an optical fiber operably supported within the tapered fiber through hole of the example guide member to form a guiding device.
Figure 7C:
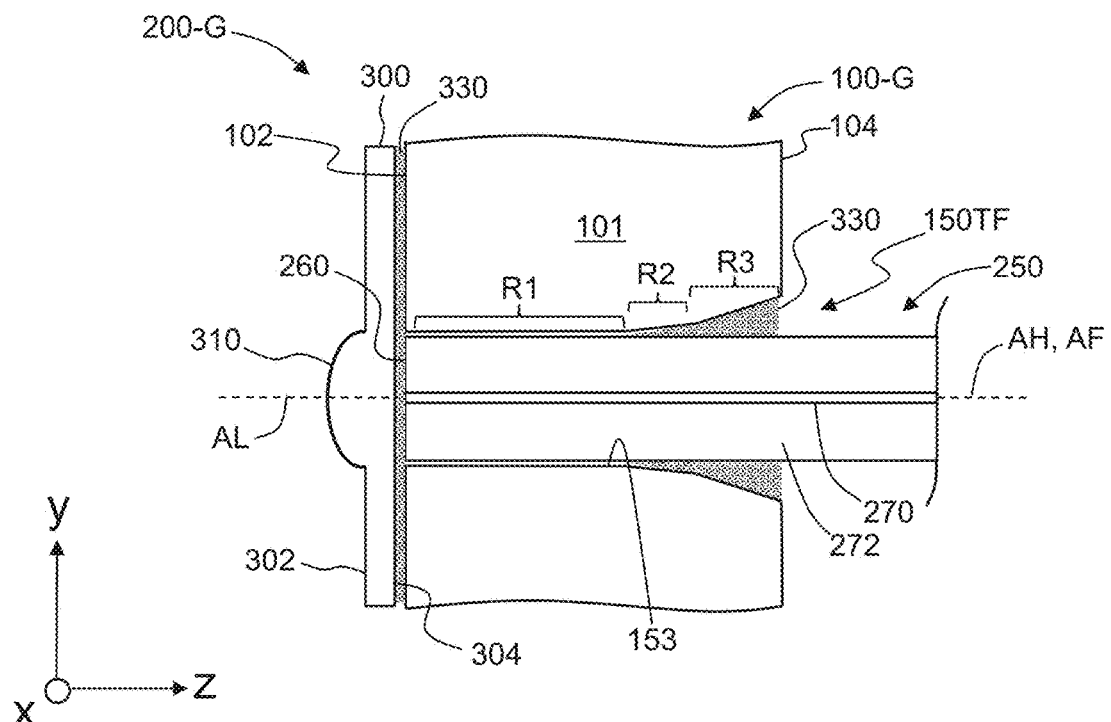
FIG. 7C is similar to FIG. 7B and illustrates an example guiding device that has a lens plate secured to the front surface of the guide member.

FIG. 7C is similar to FIG. 7B and illustrates an embodiment of a guiding device 200-G that includes a lens plate 300 operably disposed at the front surface 102 of the guide member 100-G. The lens plate 300 has a front surface 302 and a back surface 304, which resides immediately adjacent to the front surface 102 of the guide member 100-G. A lens 310 resides at the front surface 302 and has a lens axis AL. The lens 310 can comprise a curved portion of the front surface 102 or can comprise a separate piece added to the lens plate 300. In an example, the lens plate 300 is secured to the front surface 102 of the guide member 100-G using a securing material 330, which in an example can be an adhesive (e.g., a UV-curable adhesive). In an example, the lens plate 300 is made of glass, such as fused silica.

In an example the CTE (Coefficient of Thermal Expansion) of the two glasses used for the lens plate 300 and the guide member 100-G is closely matched (e.g., to within 1-2 ppm/K) to prevent excessive warpage during thermal cycling. For example, if the lens plate 300 is fabricated using IRIS™ glass (CTE of 8 ppm/K), then guide member 100-G can have a CTE in the range from 6 ppm/K to 10 ppm/K.

Figure 7D:
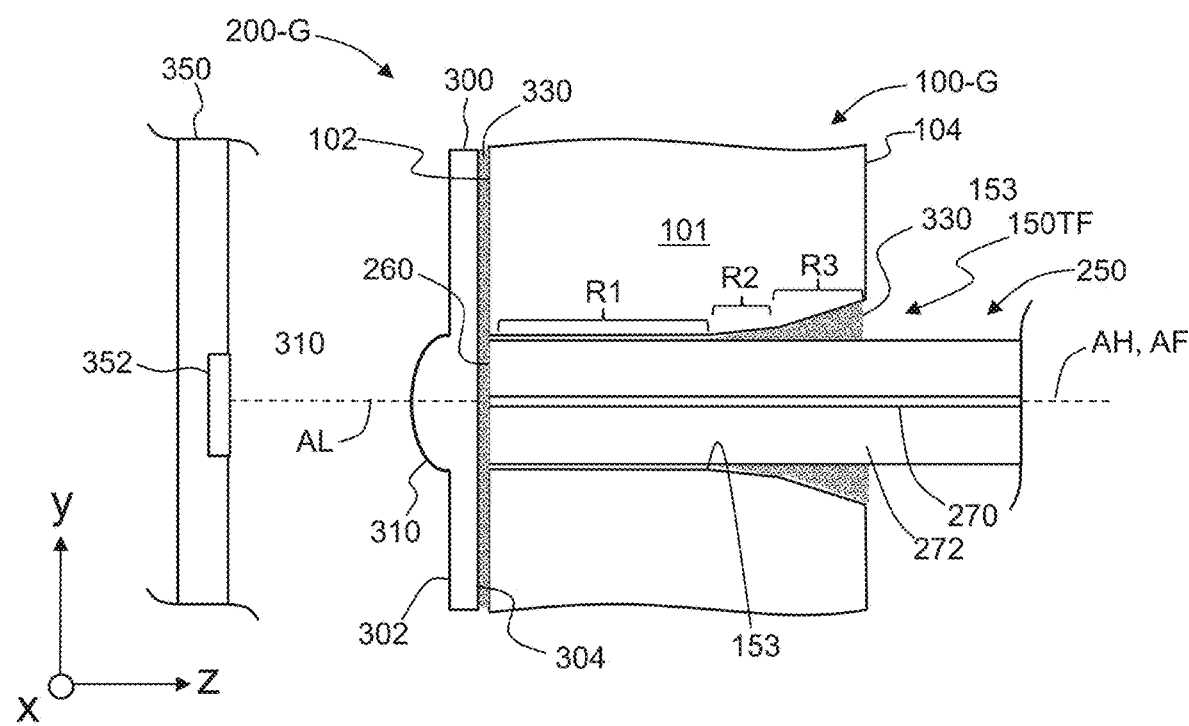
FIG. 7D is similar to FIG. 7C and illustrates an embodiment where the interconnection device is operably disposed relative to an external component that includes an optical-electrical device.

FIG. 7D is similar to FIG. 7C and illustrates an embodiment where the interconnection device 200-G is operably disposed relative to an external component 350 that includes an optical-electrical device 352, which can be an optical transmitter or an optical detector. The external component 350 can be an optical transmitter module, an optical detector module, a transducer module, etc. The interconnection device 200-G is arranged to be in optical communication with the optical-electrical device 352. FIGS. 7B through 7D are not shown to scale for ease of illustration.

In an example, FIGS. 7C and 7D show just one fiber through-hole 150TF in the aforementioned array 151 of fiber through-holes for the guide member 100-G that supports one fiber 250 in each fiber through hole, and wherein the lens plate 300 includes multiple lenses 310 operably aligned with respective fiber through-holes 150TF. Such a configuration can provide optical coupling to an array of optical-electrical devices 352.

Figure 8A:
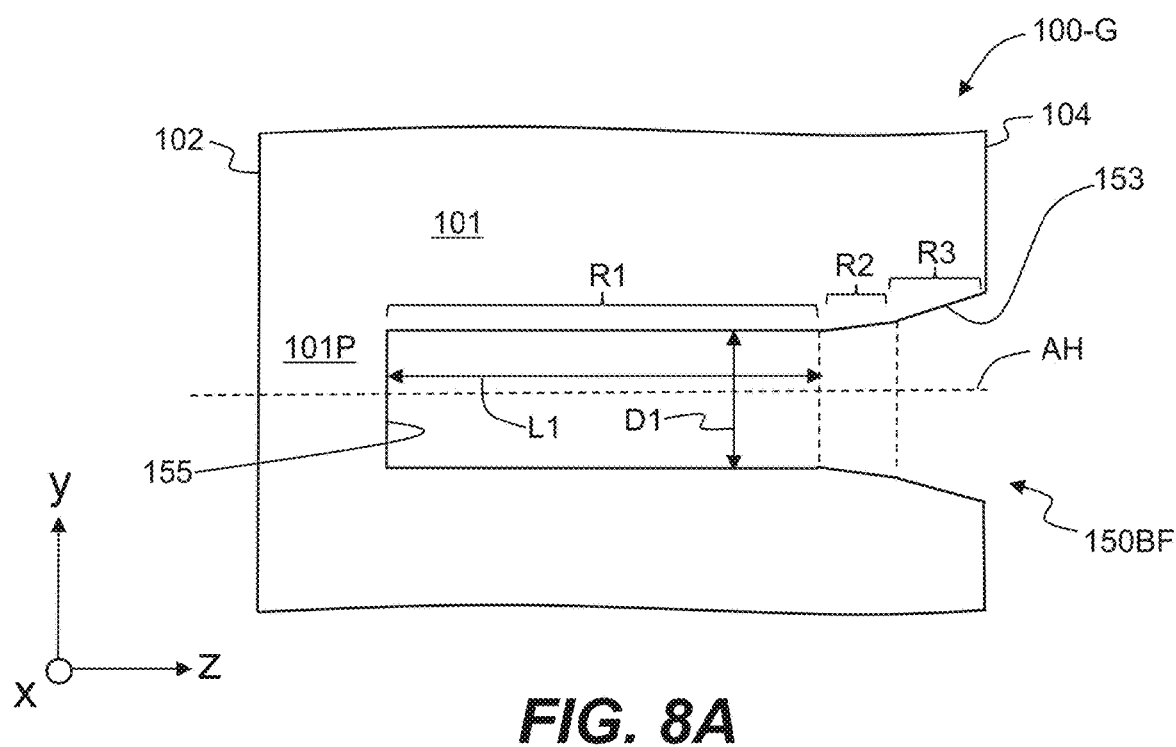
FIG. 8A is a close-up view of a tapered fiber blind hole.

FIG. 8A is similar to FIG. 7A and shows an embodiment of a guide member 100-G having a fiber recess or closed hole or "blind hole" 150BF. The example fiber blind hole 150BF has includes the three regions R1 through R3, with the region R1 terminated by an end wall 155 that is recessed relative to the back surface 104 and in an example is substantially parallel to the front surface 102 of the guide member 100-G. Thus, the interior surface 151 has a tapered shape that flares outward toward the back surface 104 where region R3 resides. The portion 101P of the body 101 of the guide member 100G resides between the end wall 155 and the front surface 102. In an example, the length L1 of the region R1 satisfies L1 ≥5.DF. Also in an example, the diameter D1 of the region R1 is close in size to the fiber diameter DF to ensure a close fit, e.g., D1 is about 1 micron greater than the fiber diameter DF.

Figure 8B:
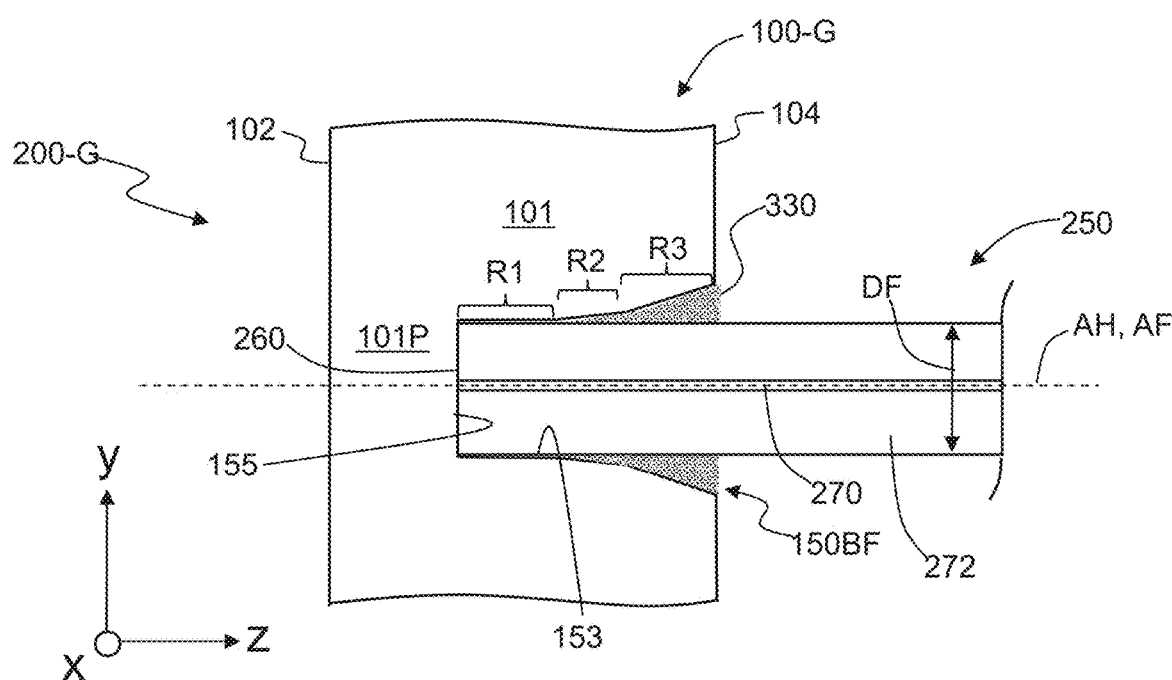
FIG. 8B is similar to FIG. 8A and shows an optical fiber operably supported within the tapered fiber blind hole, with the optical fiber end face proximate to or in contact with an end wall portion of the interior surface of the fiber blind hole.

FIG. 8B is similar to FIG. 8A and illustrates an example guiding device 200-G wherein a fiber 250 is inserted into the blind hole 150BF from the back surface 104 so that the endface 260 of the fiber resides immediately adjacent or is in contact with the end wall 155.

Figure 8C:
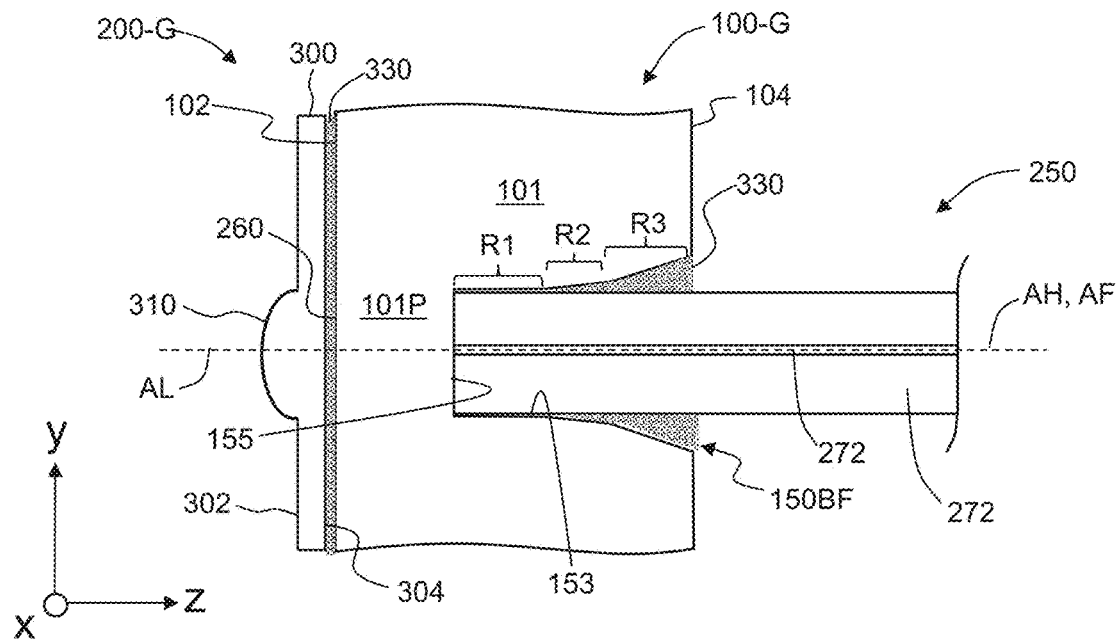
FIG. 8C is similar to FIG. 8B and illustrates an example guiding device that has a lens plate secured to the front surface of the guide member.

FIG. 8C is similar to FIG. 7C and shows an example of the guiding device 200-G of FIG. 8B that further includes the lens plate 300 at the front surface 102.

Figure 8D:
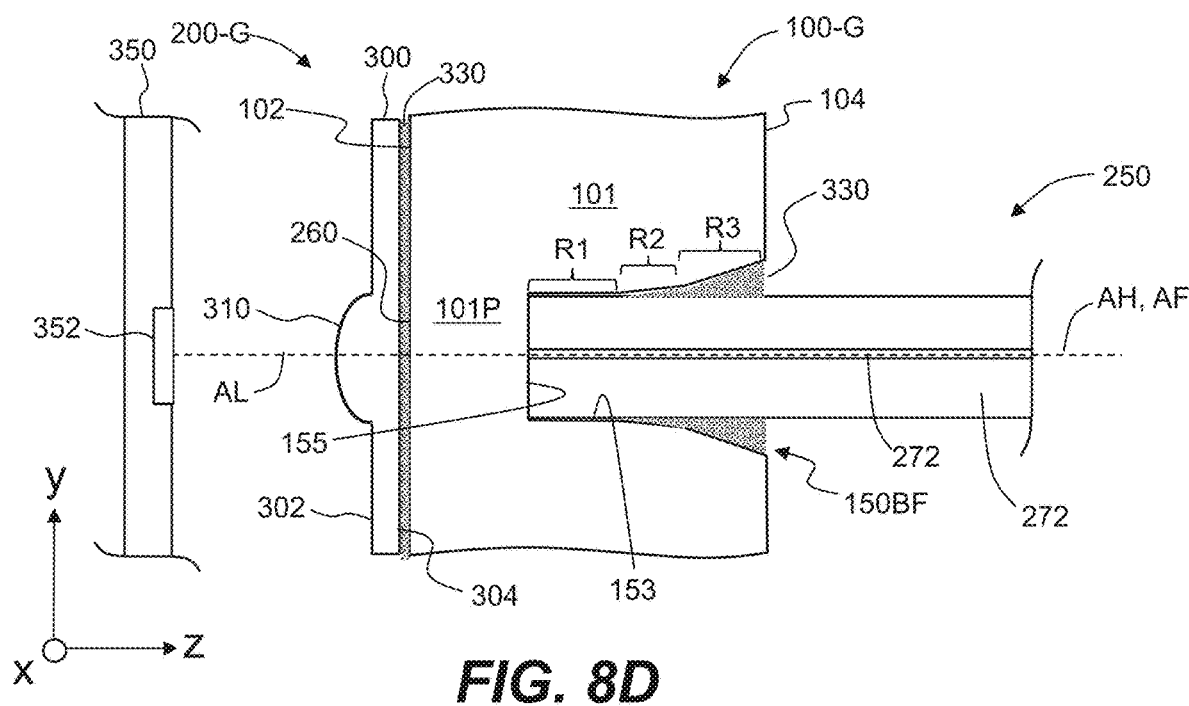
FIG. 8D is similar to FIG. 8C and illustrates an embodiment where the interconnection device is operably disposed relative to an external component that includes an optical-electrical device.

FIG. 8D is similar to FIG. 8C and illustrates an embodiment where the interconnection device 200-G is operably disposed relative to an external component 350 that includes an optical-electrical device 352, which can be an optical transmitter or an optical detector. The external component 350 can be an optical transmitter module, an optical detector module, a transducer module, etc. The interconnection device 200-G is arranged to be in optical communication with the optical-electrical device 352. FIGS. 8B through 8D are not shown to scale for ease of illustration.

In an example, FIGS. 8C and 8D show just one fiber through-hole 150TF in the aforementioned array 151 of fiber through-holes for the guide member 100-G that supports one fiber 250 in each fiber through hole, and wherein the lens plate 300 includes multiple lenses 310 operably aligned with respective fiber through-holes 150TF. Such a configuration can provide optical coupling to an array of optical-electrical devices 352.

Optical Fiber Interconnection Assemblies

Figure 9A:
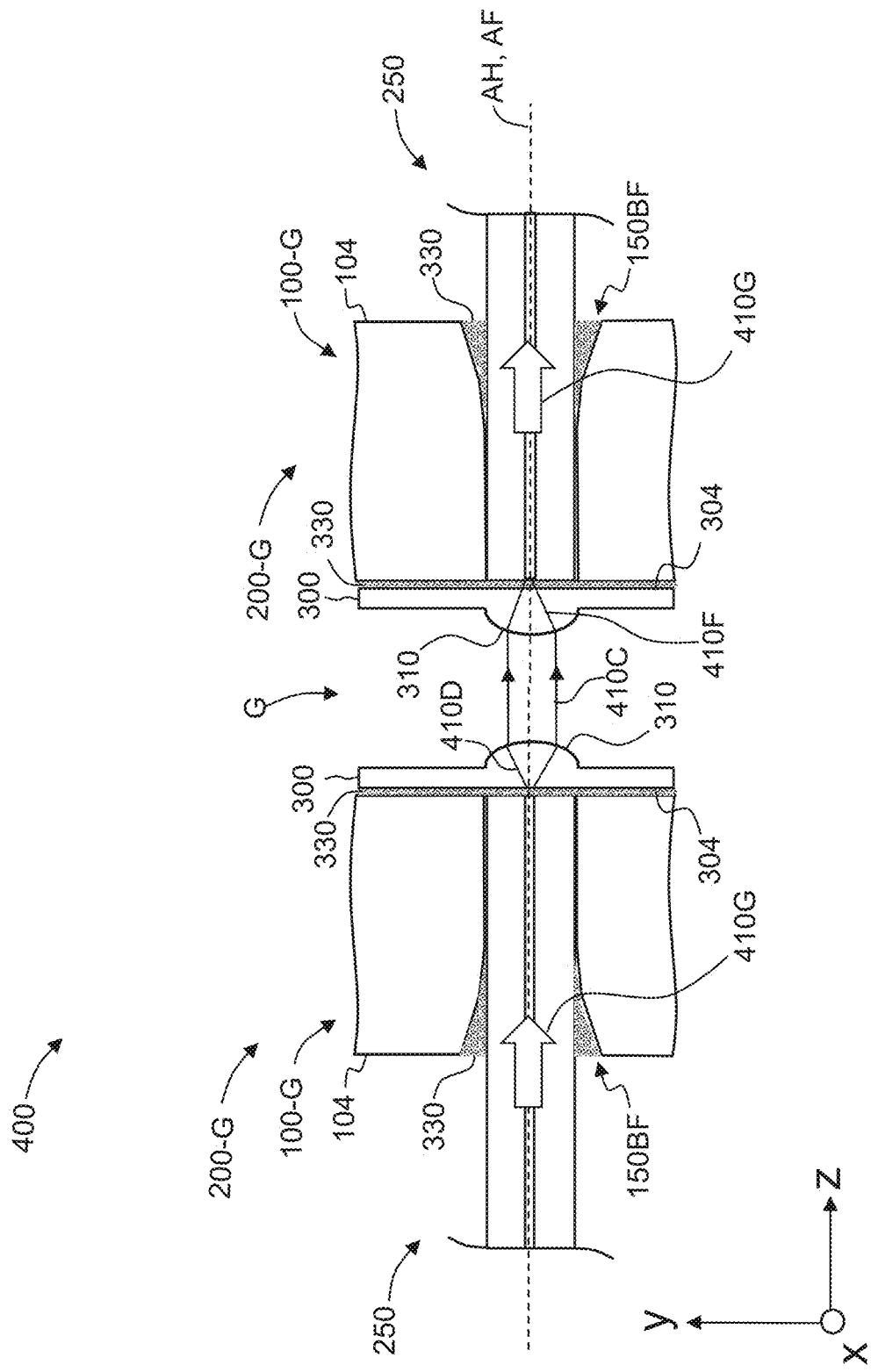
FIG. 9A is a y-z cross-section view an example connector assembly formed using two of the interconnection devices of FIG. 7C.
Figure 9B:
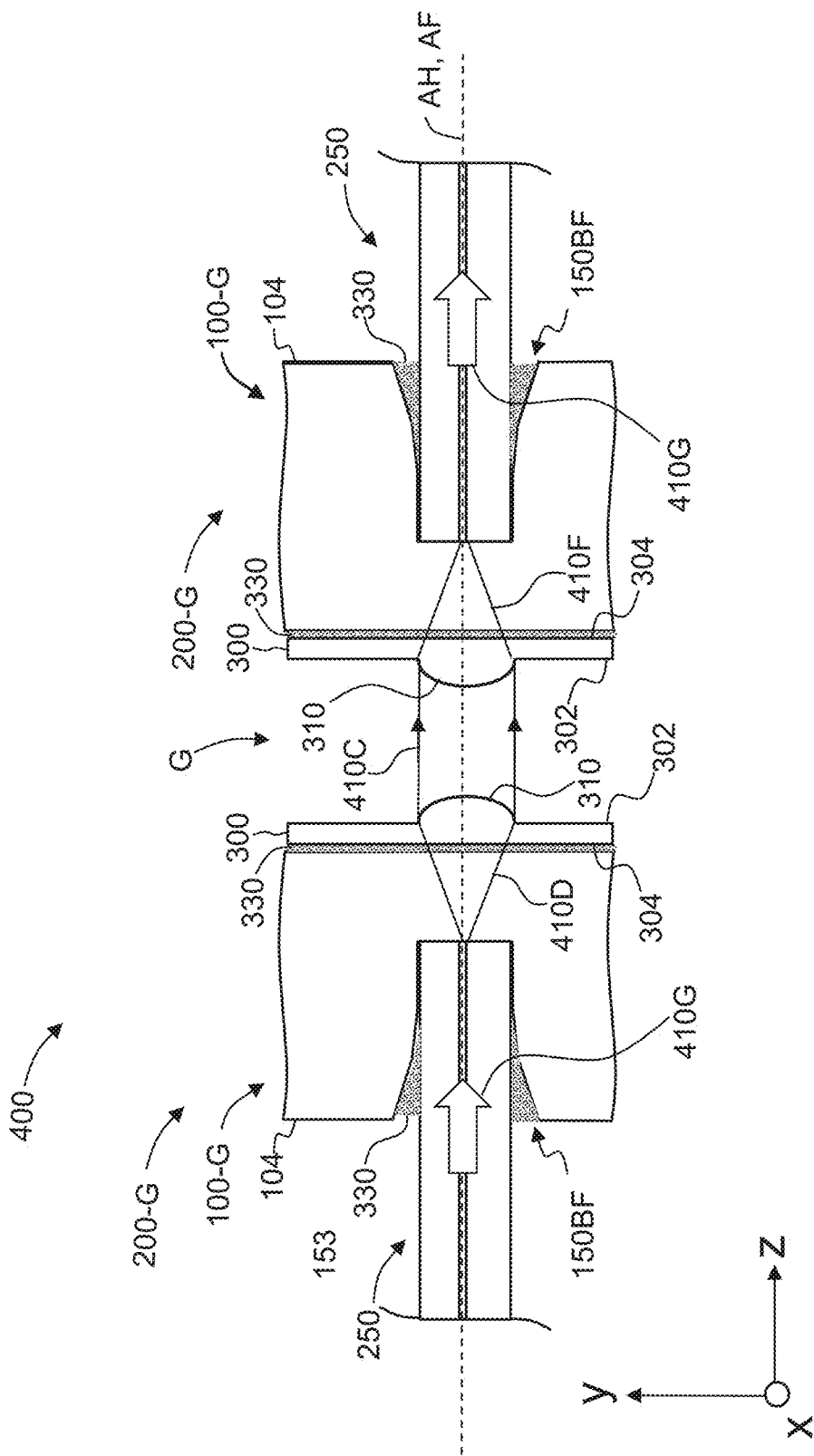
FIG. 9B is a y-z cross-section view an example connector assembly formed using two of the interconnection devices of FIG. 8C.

FIGS. 9A and 9B are a schematic diagrams of different configurations of an example fiber component in the form of an optical fiber interconnection assembly ("connector assembly") formed by interfacing two interconnection devices 200-I. FIG. 9A is a y-z cross-sectional view of an example connector assembly 400 formed using two of the interconnection devices 200-I of FIG. 7C while FIG. 9B is a y-z cross-sectional view of s an example connector assembly 400 formed using two of the interconnection devices 200-I of FIG. 8C.

In each example connector assembly 400 of FIGS. 9A and 9B, guided light 410G starts in one of the fibers 250 (e.g., from a remote light source, not shown) and exits the fiber end face 260 as diverging light 401D. The diverging light 410D reaches the lens 310, which converts the diverging light to substantially collimated light 410C. The substantially collimated light traverses a gap G between the two confronting interconnection devices 200-I. The substantially collimated light 410C reaches the lens 310 of the other interconnection device and this lens coverts the substantially collimated light to focused (converging) light 410F. This focused light 410F is incident upon the end face 260 of the other fiber 250 and then travels in the other fiber as guided light 410G.

In the example connector assembly 400 of FIG. 9A, the fiber end face 260 resides substantially at the lens plate 300, i.e., there is no intervening body portion 101P of the body 101 of the interconnect member like there is in the example connector assembly of FIG. 9B. Thus, in the connector assembly 400 of FIG. 9A, the diverging light 410D does not have as much distance to diverge as in the example connector assembly of FIG. 9B. This feature is advantageous for use with fibers 250 having a large numerical aperture (NA), i.e., a large amount of divergence in the diverging light 410D. Such fibers 250 include multimode fibers and certain types of single mode and few-moded fibers.

The example connector assembly 400 of FIG. 9B includes the body portion 101P, which allows distance for the diverging light 410 to spread and likewise for the focused light 410F to be focused. This configuration is useful for fibers 250 having a relatively low NA, such as single mode fibers.

Fiber Holes with Flexible Grippers

The liquid-based laser machining process for forming features 150 in the form of fiber through-holes 150TF or fiber blind holes 150BF (collectively referred to below as "fiber holes 150HF") can be modified to integrate additional glass structures. Such fiber holes 150HF are now discussed in the context of example guide members 100-G or example interconnect members 100-I since the modified fiber holes can be used for both types of members.

Figure 10A:
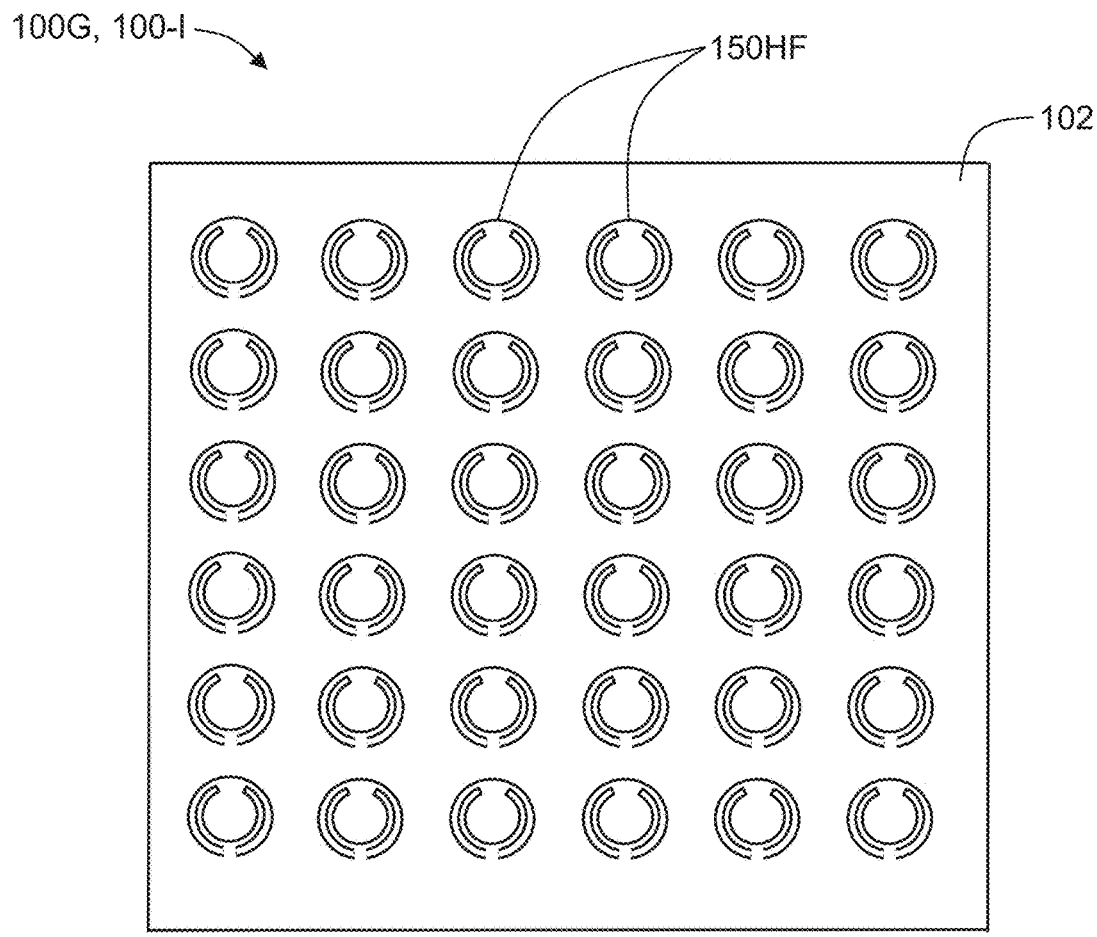
FIG. 10A is a plan view of an example guide member or interconnect member having an array of fiber through-holes, wherein each fiber through-hole includes a flexible gripper structure ("flexible gripper").
Figure 10B:
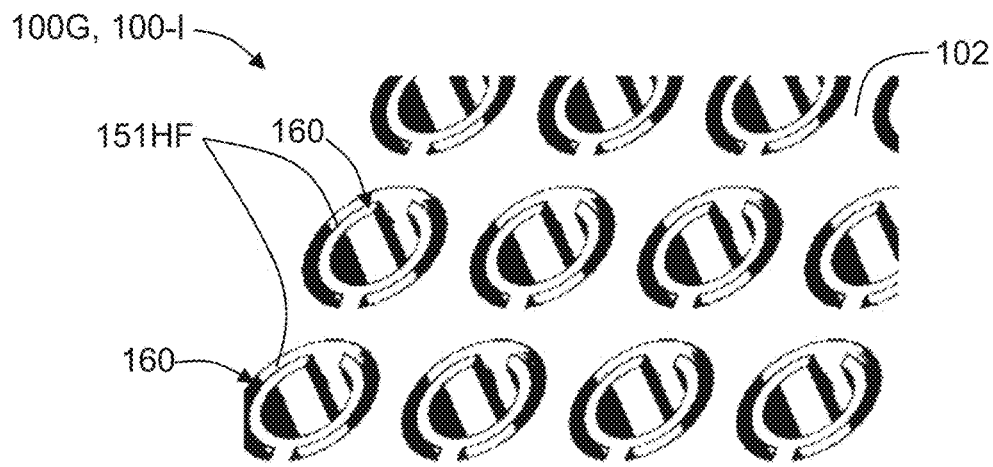
FIG. 10B is a close-up top elevated view of the example guide member or interconnect member of FIG. 10A.

FIG. 10A is a plan view and FIG. 10B is a close-up top elevated view of an example guide member 100-G or interconnect member 100-I having an array 151 of fiber holes 150HF, wherein each fiber hole includes a flexible gripper structure ("flexible gripper") 160. The flexible gripper 160 can be formed along at least a portion of the length of the fiber hole 150HF. The use of flexible grippers 160 can provide extra volume within the fiber hole 150H for index matching gel or epoxy and can also reduce the insertion force needed to bring two fibers 250 in optical contact. The flexible grippers 160 can eliminate the need for index matching liquid or securing material 330 if the fiber end faces 260 are properly prepared, e.g., laser-polished.

Figure 10C:
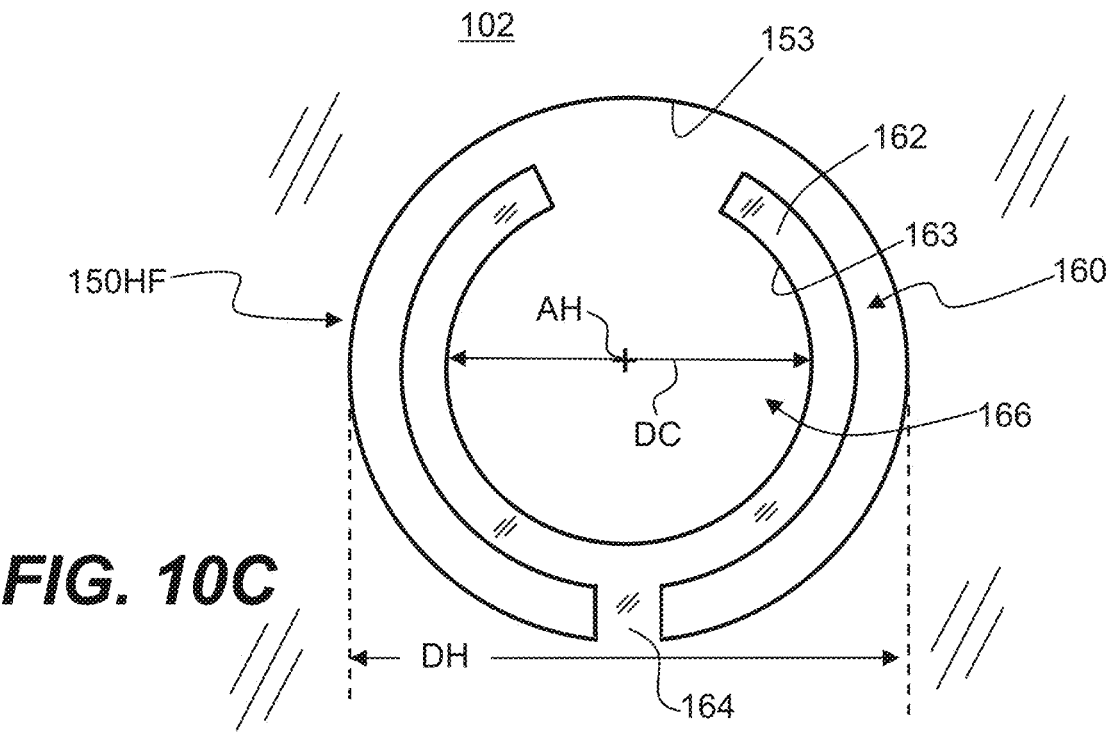
FIG. 10C is a close-up top-down view of one of the fiber holes of FIGS. 10A and 10B and shows details of the example flexible gripper.
Figure 10D:
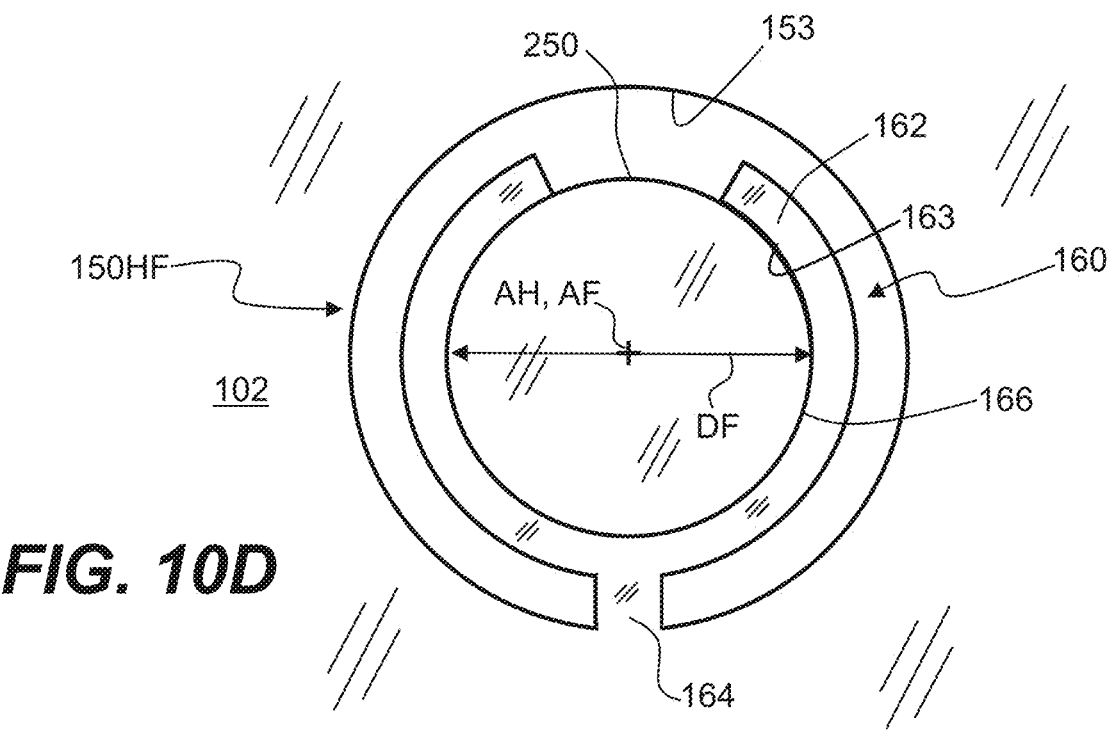
FIG. 10D is similar to FIG. 10C and shows an optical fiber being held centered within the fiber hole by the flexible gripper.

FIG. 10C is a close-up top-down view of one of the fiber holes 150HF of FIGS. 10A and 10B shows details of the example flexible gripper 160. The example flexible gripper 160 includes a C-shaped gripping member 162 attached to the body 101 of the interconnect member 100-I or guide member 100-G via a stem-like base 164. The C-shaped gripping member 162 has an inside surface 163 that defines a slotted aperture 166 centered on the hole axis AH. The slotted aperture 166 has an inside diameter DC sized to closely accommodate or to grip a fiber 250. The C-shaped gripping member 162 of the flexible gripper 160 is designed to outwardly deflect (expand) when a fiber 250 is inserted into the fiber hole 150HF, as shown in FIG. 7D. Since the deflection of the C-shaped gripping member 162 is substantially the same in all directions, the fiber 250 remains substantially centered in the fiber through-hole., i.e., with the fiber axis AF coaxial with the hole axis AH.

In an example, the gripper diameter DC is designed to be slightly smaller than the diameter DF of a standard fiber (e.g., reduced from 2 microns to 10 microns). While the diameter DH of the fiber through-hole 151TF and related interior surface dimensions are expected to change slightly due to processing variations, the variation is expected to be similar for the flexible grippers so that the fiber 250 remains centered in the grippers.

Figure 11A:
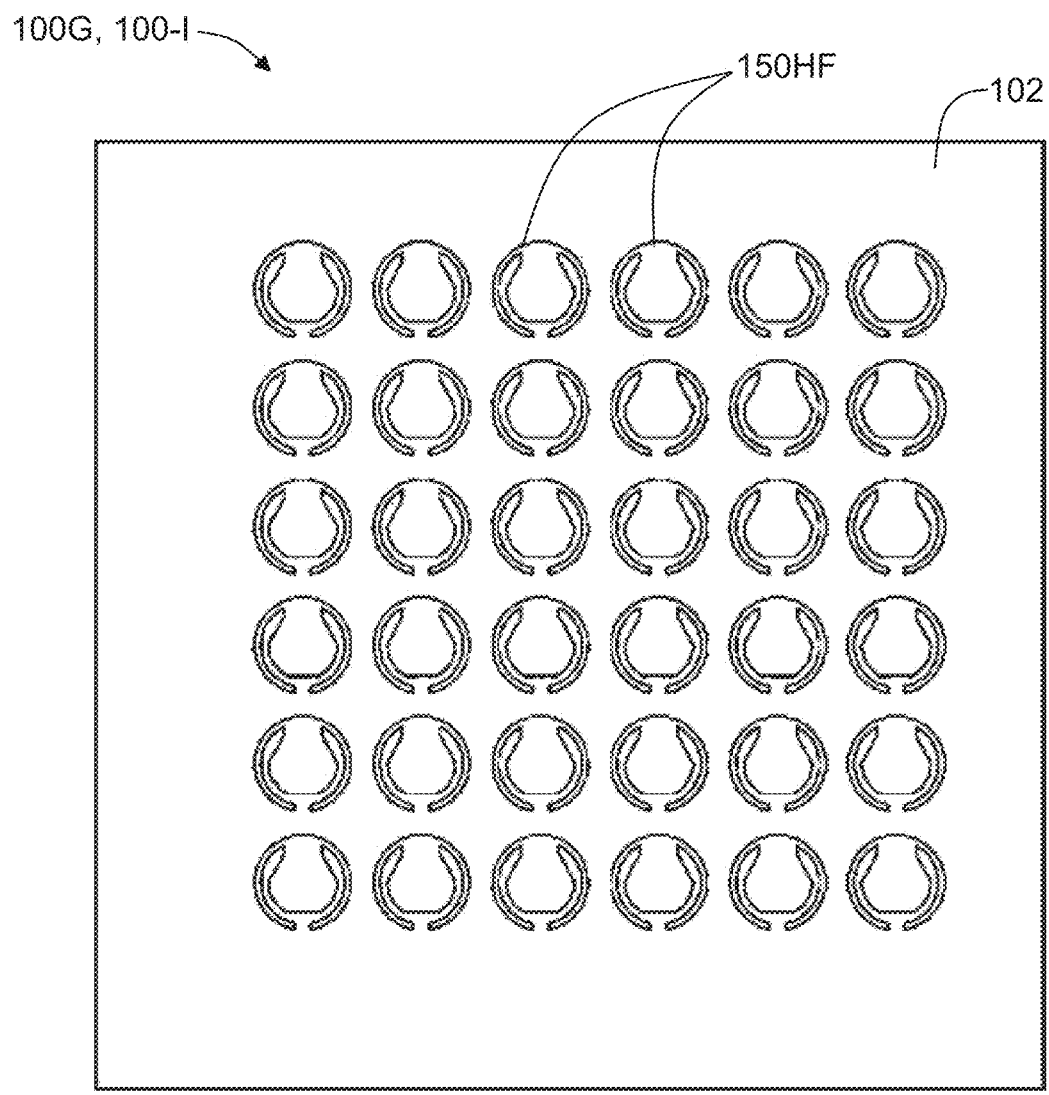
FIG. 11A is a plan view of an example guide member or interconnect member that includes fiber holes similar to that shown in FIGS. 10A through 10D but wherein the inside surface of the C-shaped gripping member includes three flat sections.
Figure 11B:
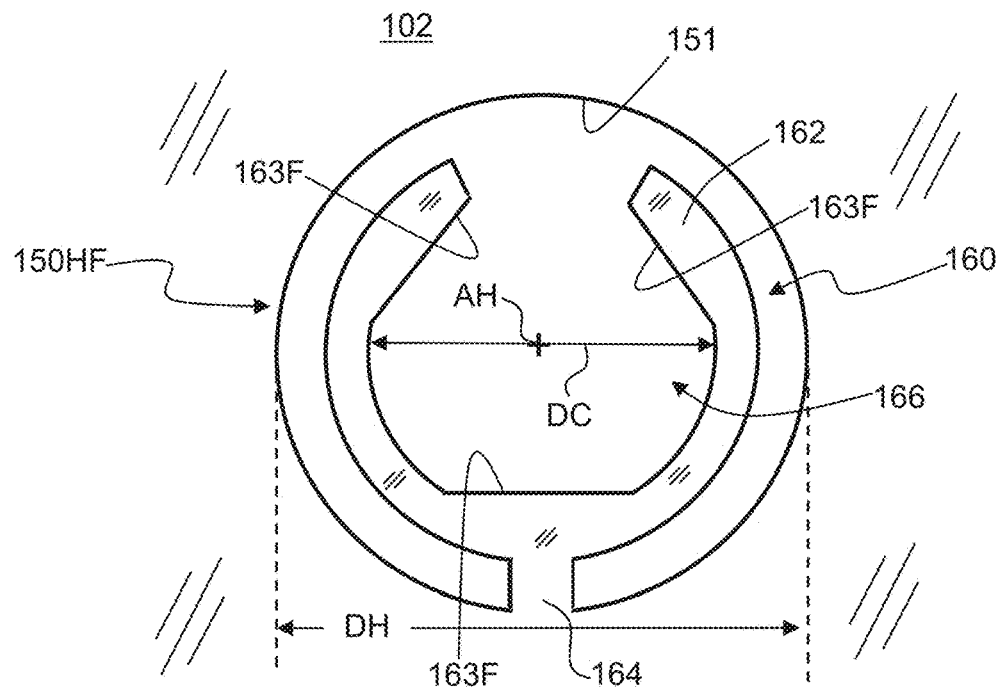
FIG. 11B is close-up top-down view of one of the example fiber holes of FIG. 11A.
Figure 11C:
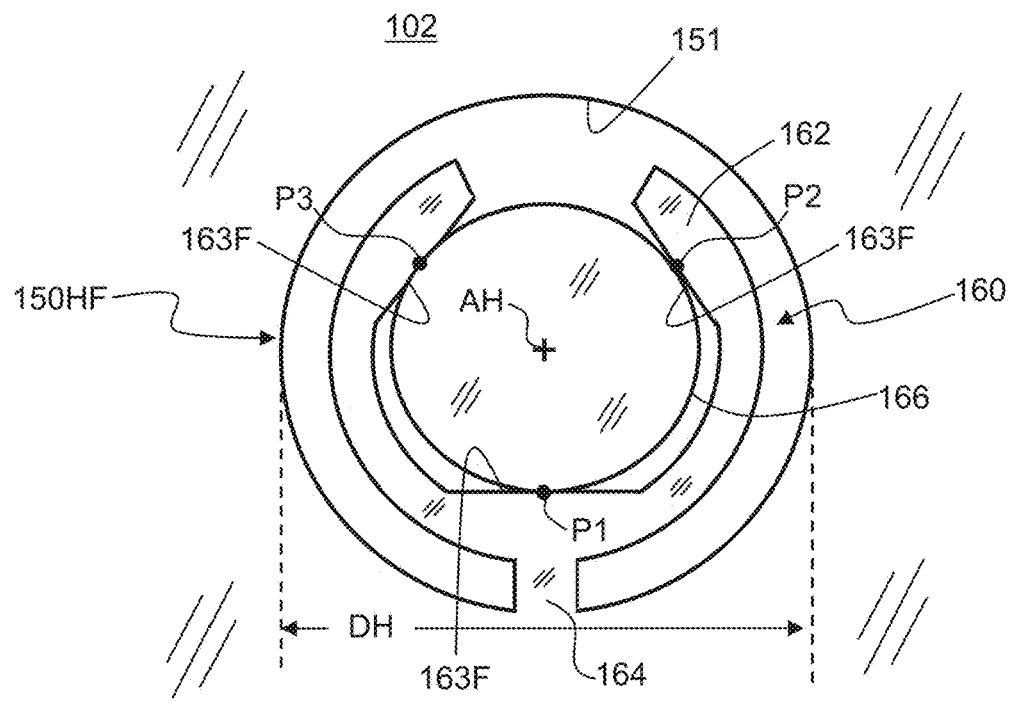
FIG. 11C is similar to FIG. 11B and shows how the three flat sections of the C-shaped gripping member provide three points of contact with the fiber held by the C-shaped gripping member.
Figure 11D:
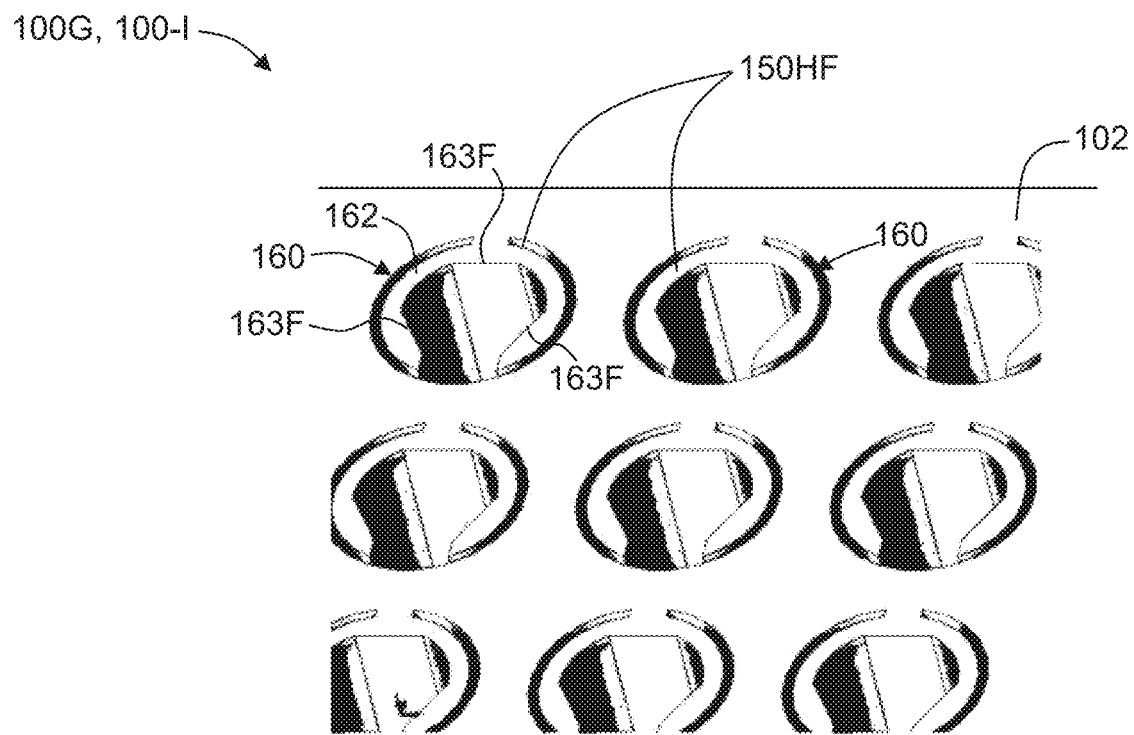
FIG. 11D is a top elevated view of the example guide member or interconnect member showing some of the example fiber holes each with the example flexible gripper of FIGS. 11A and 11B.

FIG. 11A is a plan view of an example guide member 100-G or interconnect member 100-I that includes fiber holes 150HF similar to that shown in FIGS. 10A through 10D but wherein the inside surface 163 of the C-shaped gripping member 160 includes three flat sections (surfaces) 163F, as shown in the close-up view of FIG. 11B. In an example, the three flat sections 163F are oriented roughly 120° from each other so that they contact the fiber 250 at roughly equally spaced locations around the fiber. FIG. 11C is similar to FIG. 11B and shows how the three flat sections 163F provide three points of contact P1, P2 and P3 with the fiber 250 held by the C-shaped gripping member 162 of the flexible gripper 160. FIG. 11D is a top elevated view of the example guide member 100-G or interconnect member 100-I that includes the example fiber holes 150HF with the flexible gripper 160 of FIGS. 11A and 11B and showing more detail of the flexible gripper 160 and in particular the three flat surfaces 163F.

Figure 12A:
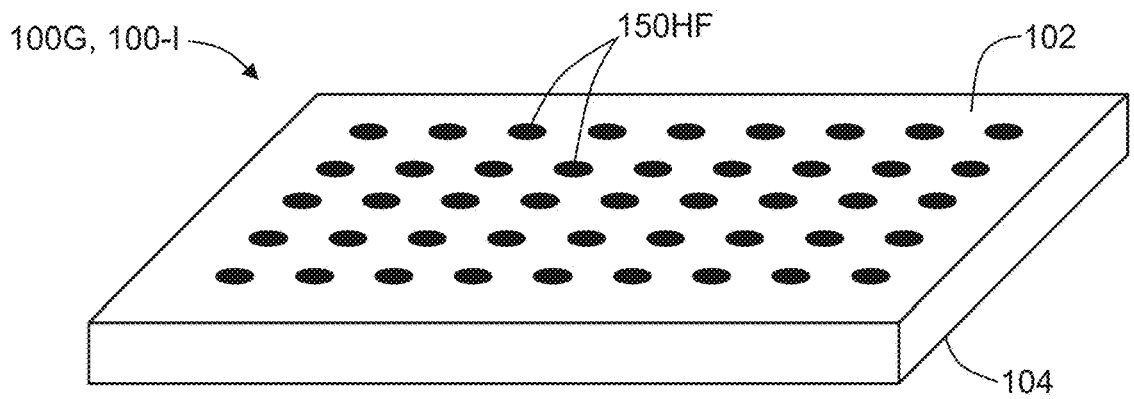
FIG. 12A is a top elevated view of an example guide member or interconnect member that has an array of fiber holes.
Figure 12B:
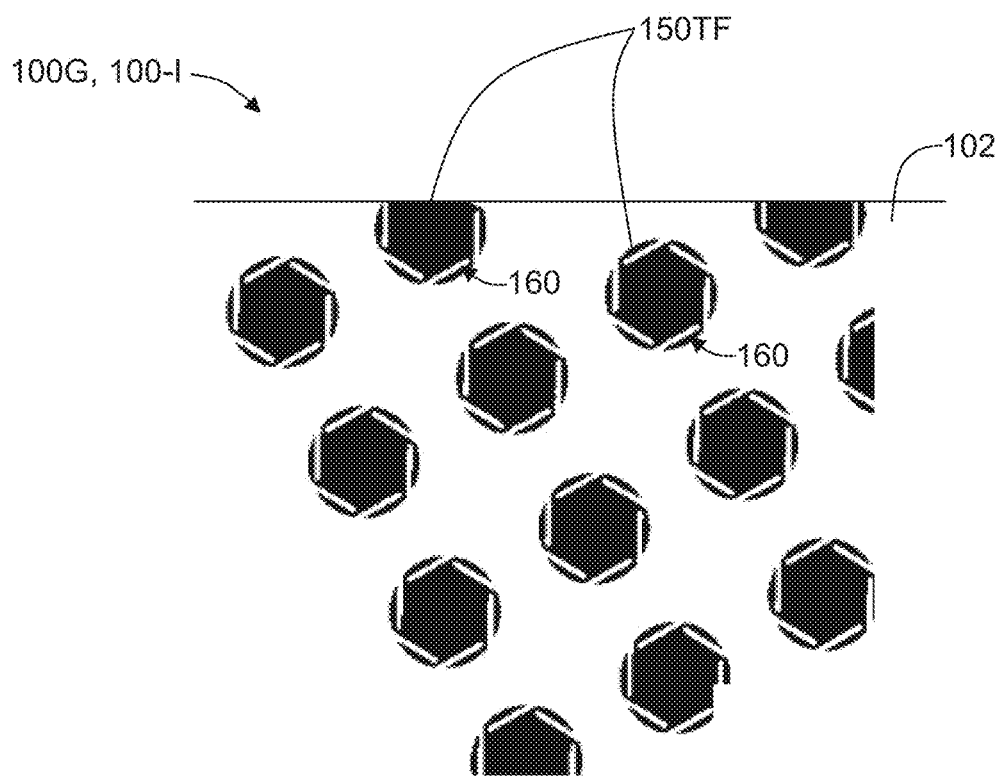
FIG. 12B is a close-up top-down view of some of the fiber holes of FIG. 12A showing an example configuration of the flexible gripper that has flexible fingers.
Figure 12C:
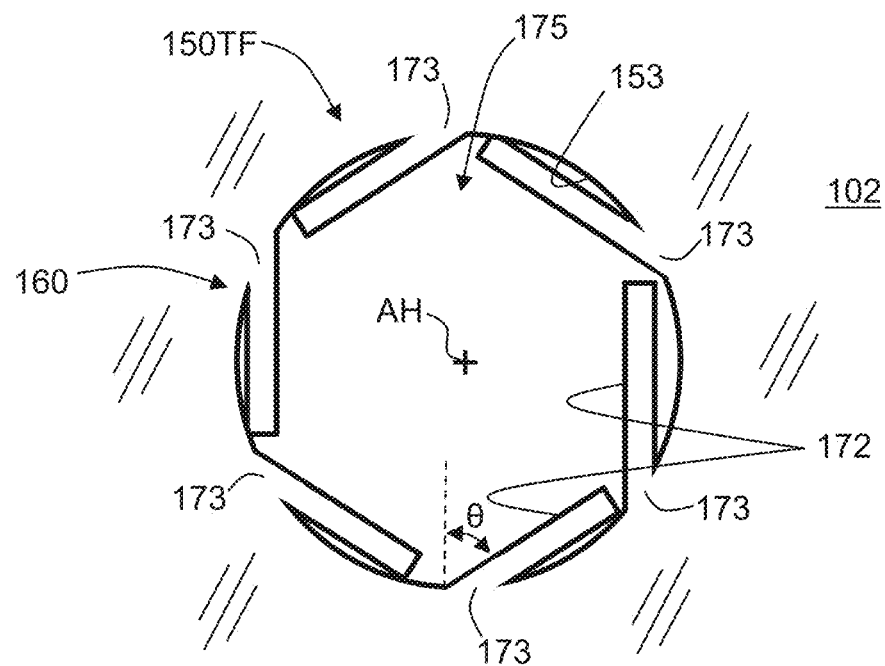
FIG. 12C is a close-up top-down view of the one of the fiber holes and flexible grippers of FIG. 12B, showing an example where the flexible gripper is defined by six flexible fingers arranged at an angle relative to a radial direction, and wherein the flexible fingers define a receiving area for an optical fiber.

FIG. 12A is a top elevated view of an example guide member 100-G or interconnect member 100-I that includes an array 151 of fiber through-holes 150TF having an example flexible gripper 160, which are more clearly seen in the close-up plan views of FIGS. 12B and 12C. The flexible gripper 160 is defined by two or more flexible fingers 172 that define a receiving area 175 for the fiber (FIG. 12C).

Figure 12D:
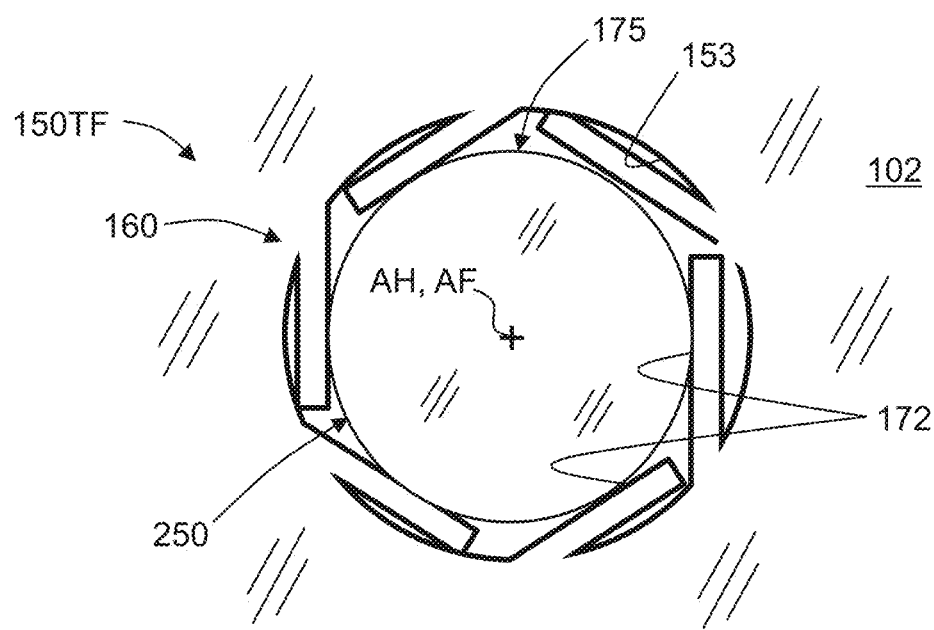
FIG. 12D is similar to FIG. 12C but includes an optical fiber operably disposed and held within the receiving area by the flexible fingers.

The flexible fingers 172 extend inwardly from a based 173 at the interior surface 153 at a finger angle θ measured relative to a radial line RL that is perpendicular to the local interior surface 153 and that passes through the hole axis AH. The particular value of the finger angle θ depends on the number of fingers 172 used to constitute the flexible gripper 160, but generally the finger angle θ is greater than zero so that the fingers 172 deflect toward the interior surface when a fiber 250 is added to the receiving area 175 of fiber hole 150H, as shown in FIG. 12D. In particular, the ends of the six fingers 172 are designed specifically to be spaced a predefined distance away from the adjacent local interior surface 153. This distance allows each finger 172 to deflect slightly during fiber insertion so that the finger can apply a gripping force to the fiber that centers it between the six fingers and thus with the fiber and holes axes AF and AH being substantially coaxial. In the example of the flexible gripper 160 shown in FIGS. 12B through 12D, six fingers 172 are employed, and an example finger angle θ is about the same as that associated with a hexagon, namely 30 degrees. This defines a substantially hexagonal receiving area 175 for the fiber 250. The acute angle near 173 formed where the gripper 172 meets the local interior surface 153 can be replaced by a small radius hairpin bend to limit stress concentration at the acute location when the gripper 172 is deflected. In fact, the profile surface for the local interior surface 153 can be moved further away from the gripper finger 172 to ensure that there is no interference between the gripper finger 172, which plays a role in fiber alignment, and the local interior surface 153, which only needs to provide adequate clearance for the gripper finger to prevent it from contacting the local interior surface 153.

In an alternative example, three or more flexible fingers 172 can be arranged around the inside perimeter of the fiber hole 150, where each finger deflects towards the perimeter during fiber insertion to grip and center the fiber within the fiber hole 150HF so that the hole axis AH and the fiber axis AF are substantially coaxial. In an example, the number of flexible fingers 172 can be defined by the number of contact points with the fiber 250.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of processing a substrate having a substrate body made of a transparent dielectric material and having a first surface and an opposite working surface, comprising:
    disposing the working surface to be in contact with a liquid-assist medium that comprises fluorine, wherein the concentration of the fluorine in the liquid-assist medium is greater than 30 wt %;
    forming from a pulsed laser beam a focused laser beam and directing the focused laser beam through the first surface and the opposite working surface to form a focus spot having an initial position in the liquid-assist medium;
    moving the focus spot over a motion path from the initial position in the liquid-assist medium through the substrate body in a general direction from the working surface to the first surface to create a modification of the transparent dielectric material that defines a core portion of the body; and
    removing the core portion from the body of the substrate to form a feature in the substrate.

2. The method according to claim 1, further comprising forming the focused laser beam from a laser source disposed relative to the substrate such that the first surface resides between the laser light source and the working surface.

3. The method according to claim 2, wherein the pulsed laser beam comprises optical pulses with a pulse duration in the range from 1 picosecond to 50 picoseconds.

4. The method according to claim 1, wherein the substrate comprises glass.

5. The method according to claim 1, wherein the initial position of the focus spot resides within 10 microns to 50 microns of the working surface.

6. The method according claim 1, wherein the focus spot induces a non-linear absorption in the substrate to create the modification of the transparent dielectric material.

7. The method according claim 1, wherein the modification of the transparent dielectric material comprises ablation of the transparent dielectric material by the focus spot.

8. The method according to claim 1, wherein the modification comprises forming a plurality of micromachined regions in the substrate.

9. The method according to claim 8, wherein the plurality of micromachined regions are arranged in a substantially helical pattern.

10. The method according to claim 9, wherein the substantially helical pattern comprises cross-cuts.

11. The method according to claim 8, wherein the plurality of micromachined regions are arranged in a substantially helical pattern.

12. The method according to claim 11, wherein the substantially helical pattern comprises cross-cuts.

13. The method according to claim 1, wherein the feature comprises at least one of: a hole, a groove, a channel, a slot and a recess.

14. The method according to claim 1, wherein the feature comprises either a through-hole or a blind hole.

15. The method according to claim 1, wherein the feature has an interior surface and a cross-section with a linear dimension having a variability attributable to a root-mean-square (RMS) surface roughness of the interior surface of less than 1.0 µm.

16. The method according to claim 15, wherein the feature has an aspect ratio greater than 2:1.

17. The method according to claim 15, wherein the feature has an aspect ratio greater than 6:1.

18. The method according to claim 15, wherein the cross-section is round and the linear dimension is a diameter of the cross-section, such that the feature is cylindrical.

19. The method according to claim 1, wherein the concentration of the fluorine in the liquid-assist medium is greater than 60 wt %.

20. The method according to claim 1, wherein the liquid-assist medium has a boiling point greater than 150° C.

21. The method according to claim 1, wherein the liquid-assist medium has a surface tension less than 40 dynes/cm at 25° C.

22. The method according to claim 1, wherein the liquid-assist medium has a surface tension less than 20 dynes/cm at 25° C.

23. The method according to claim 1, wherein the feature comprises either a through-hole or a blind hole having a diameter of less than 200 microns, an aspect ratio of greater than 10 and an interior surface with a root-mean square (RMS) roughness of less than 0.8 microns.

24. The method according to claim 1, wherein the feature comprises either a through-hole or a blind hole having a diameter of less than 200 microns, an aspect ratio of greater than 10 and an interior surface with a root-mean square (RMS) roughness of less than 0.5 microns.

25. A method of processing a substrate having a substrate body made of a transparent dielectric material and having a first surface and an opposite working surface, comprising:
    disposing the working surface to be in contact with a liquid-assist medium that comprises fluorine, wherein the liquid-assist medium is selected from the group consisting of: fluorinated alkanes, fluorinated alcohols, and fluorinated amines;
    forming from a pulsed laser beam a focused laser beam and directing the focused laser beam through the first surface and the opposite working surface to form a focus spot having an initial position in the liquid-assist medium;
    moving the focus spot over a motion path from the initial position in the liquid-assist medium through the substrate body in a general direction from the working surface to the first surface to create a modification of the transparent dielectric material that defines a core portion of the body; and
    removing the core portion from the body of the substrate to form a feature in the substrate.

26. The method according to claim 25, further comprising forming the focused laser beam from a laser source disposed relative to the substrate such that the first surface resides between the laser light source and the working surface.

27. The method according to claim 26, wherein the pulsed laser beam comprises optical pulses with a pulse duration in the range from 1 picosecond to 50 picoseconds.

28. The method according to claim 25, wherein the substrate comprises glass.

29. The method according to claim 25, wherein the initial position of the focus spot resides within 10 microns to 50 microns of the working surface.

30. The method according claim 25, wherein the focus spot induces a non-linear absorption in the substrate to create the modification of the transparent dielectric material.

31. The method according claim 25, wherein the modification of the transparent dielectric material comprises ablation of the transparent dielectric material by the focus spot.

32. The method according to claim 25, wherein the modification comprises forming a plurality of micromachined regions in the substrate.

33. The method according to claim 25, wherein the feature comprises at least one of: a hole, a groove, a channel, a slot and a recess.

34. The method according to claim 25, wherein the feature comprises either a through-hole or a blind hole.

35. The method according to claim 25, wherein the feature has an interior surface and a cross-section with a linear dimension having a variability attributable to a root-mean-square (RMS) surface roughness of the interior surface of less than 1.0 µm.

36. The method according to claim 35, wherein the cross-section is round and the linear dimension is a diameter of the cross-section, such that the feature is cylindrical.

37. The method according to claim 15, wherein the feature has an aspect ratio greater than 2:1.

38. The method according to claim 35, wherein the feature has an aspect ratio greater than 6:1.

39. The method according to claim 25, wherein the concentration of the fluorine in the liquid-assist medium is greater than 30 wt %.

40. The method according to claim 25, wherein the concentration of the fluorine in the liquid-assist medium is greater than 60 wt %.

41. The method according to claim 25, wherein the liquid-assist medium has a boiling point greater than 150° C.

42. The method according to claim 25, wherein the liquid-assist medium has a surface tension less than 40 dynes/cm at 25° C.

43. The method according to claim 25, wherein the liquid-assist medium has a surface tension less than 20 dynes/cm at 25° C.

44. The method according to claim 25, wherein the feature comprises either a through-hole or a blind hole having a diameter of less than 200 microns, an aspect ratio of greater than 10 and an interior surface with a root-mean square (RMS) roughness of less than 0.8 microns.

45. The method according to claim 25, wherein the feature comprises either a through-hole or a blind hole having a diameter of less than 200 microns, an aspect ratio of greater than 10 and an interior surface with a root-mean square (RMS) roughness of less than 0.5 microns.

* * * * *

UNITED STATES PATENT AND TRADEMARK OFFICE
CERTIFICATE OF CORRECTION

PATENT NO. : 11,247,932 B2
APPLICATION NO. : 16/257853
DATED : February 15, 2022
INVENTOR(S) : Jeffery Alan DeMeritt et al.

It is certified that error appears in the above-identified patent and that said Letters Patent is hereby corrected as shown below:

In the Claims

In Column 23, Line 42, in Claim 6, delete "according claim" and insert -- according to claim --.

In Column 23, Line 45, in Claim 7, delete "according claim" and insert -- according to claim --.

In Column 24, Line 65, in Claim 30, delete "according claim" and insert -- according to claim --.

In Column 25, Line 1, in Claim 31, delete "according claim" and insert -- according to claim --.

In Column 25, Line 22, in Claim 37, delete "claim 15," and insert -- claim 25, --.

Signed and Sealed this
Seventeenth Day of May, 2022

Katherine Kelly Vidal
*Director of the United States Patent and Trademark Office*